US008520283B2

(12) United States Patent  
Knoll

(10) Patent No.: US 8,520,283 B2  
(45) Date of Patent: Aug. 27, 2013

(54) METHOD AND APPARATUS FOR THE TIME CONTROLLED ACTIVATION OF ELEMENTS

(75) Inventor: Meinhard Knoll, Münster (DE)

(73) Assignee: Westfalische Wilhelms-Universitat Munster, Munster (DE)

( * ) Notice: Subject to any disclaimer, the term of this patent is extended or adjusted under 35 U.S.C. 154(b) by 325 days.

(21) Appl. No.: 12/740,241

(22) PCT Filed: Oct. 30, 2008

(86) PCT No.: PCT/EP2008/064712  
§ 371 (c)(1),  
(2), (4) Date: Apr. 28, 2010

(87) PCT Pub. No.: WO2009/056591  
PCT Pub. Date: May 7, 2009

(65) Prior Publication Data  
US 2010/0251955 A1    Oct. 7, 2010

(30) Foreign Application Priority Data  
Oct. 30, 2007   (GB) .................................. 0721336.6

(51) Int. Cl.  
*G02B 26/02*    (2006.01)

(52) U.S. Cl.  
USPC ........................................................ 359/228

(58) Field of Classification Search  
USPC .................. 359/265–275, 228, 665; 345/105  
See application file for complete search history.

(56) References Cited

U.S. PATENT DOCUMENTS

| 4,408,557 A * | 10/1983 | Bradley et al. ................ 116/206 |
| 5,216,536 A | 6/1993 | Agrawal et al. |
| 5,602,804 A * | 2/1997 | Haas ............................. 368/327 |
| 5,930,023 A | 7/1999 | Mitchell, Jr. et al. |
| 6,243,192 B1 | 6/2001 | Mitchell, Jr. et al. |
| 7,212,397 B2 | 5/2007 | Lang |
| 2004/0051299 A1 | 3/2004 | Shadle et al. |
| 2005/0068603 A1 | 3/2005 | Berggren et al. |

FOREIGN PATENT DOCUMENTS

| GB | 2 180 964 A | 4/1987 |
| GB | 2 295 241 A | 5/1996 |

OTHER PUBLICATIONS

UK Patent Office Search Report dated Apr. 1, 2008, Application No. GB0721336.6 (3 pgs).  
Notification of Transmittal of International Search Report, International Application No. PCT/EP2008/064712 (3 pgs).  
International Search Report, International Application No. PCT/EP2008/064712 (4 pgs).

(Continued)

*Primary Examiner* — Tuyen Tra  
(74) *Attorney, Agent, or Firm* — 24IP Law Group; Timothy R. DeWitt

(57) ABSTRACT

An apparatus and a method for activation of at least one element. The apparatus comprises at least one activation layer and at least one migration layer arranged at the at least one activation layer and being permeable to a fluid along a transversal direction across a surface of the at least one migration layer, such that a change of doping level in the at least one activation layer is achieved, for activating the at least one activation layer along the transversal direction, wherein a substrate onto which the activation layer and the migration layer are deposited comprises an opening being sealed by a gas permeable membrane, the gas-permeable membrane being in contact with a fluid container.

19 Claims, 21 Drawing Sheets

(56) References Cited

OTHER PUBLICATIONS

Written Opinion of the International Searching Authority, International Application No. PCT/EP2008/064712 (7 pgs).
Gore—Electronic & Electrochemical Materials web page; 2010 (1 pg).
Starck—Empowering High Tech Materials web page; 2010 (1 pg).
Orgacon EL-350—Trans Conductive Film (AGFA); Feb. 2006 (2 pgs).
Nilsson, D. et al.; "Bi-stable and Dynamic Current Modulation in Electrochemical Organic Transistors," Advanced Materials, vol. 14, Issue 1; Jan. 4, 2002; pp. 51-54 (4 pgs).
Andersson, P. et al.; "Active Matrix Displays Based on All-Organic Electrochemical Smart Pixels Printed on Paper," Advanced Materials, vol. 14, Issue 20; Oct. 16, 2002; pp. 1460-1464 (5 pgs).
Aleshin, A. et al.; "Transport properties of poly(3,4-ethylenedioxythiophene)/poly(styrenesulfonate)," Synthetic Metals 94; 1998; pp. 173-177 (5 pgs).
Lu, J. et al.; "Apparent dependence of conductivity of a conducting polymer on an electric field in a field effect transistor configuration," Journal of Applied Physics, vol. 92, Issue 10; Nov. 15, 2002; pp. 6033-6038 (6 pgs).

* cited by examiner

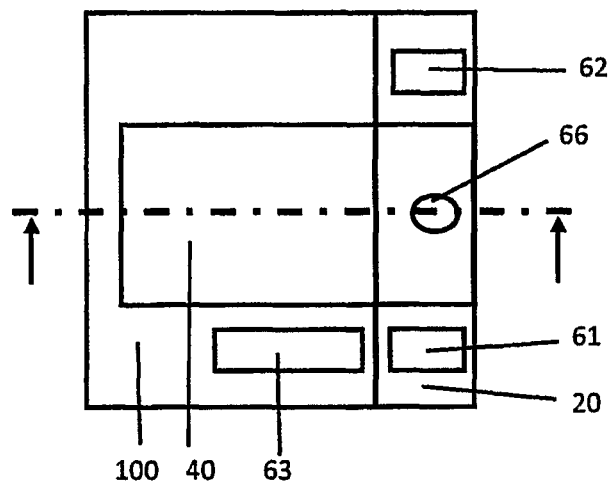
Fig. 14c)
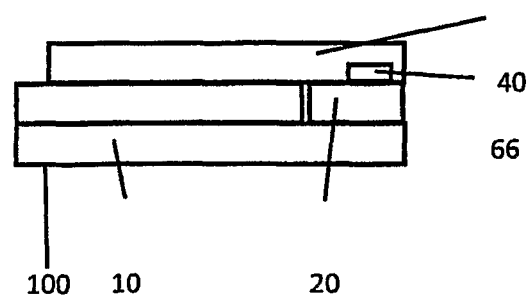
ig. 14d)

METHOD AND APPARATUS FOR THE TIME CONTROLLED ACTIVATION OF ELEMENTS

This application is a Section 371 U.S. national stage application of PCT Application No. PCT/EP2008/064712 filed on Oct. 30, 2008 and claims the benefit of priority under 35U.S.C. §119(e) and any other United States or other law of the following: UK Application No. GB 0721336.6, filed 30 Oct. 2007, UK Publication No. GB 2 454 203 A, bearing the Abstract Title "Time controlled activation of elements" - the entire disclosure of this priority case is incorporated herein by reference in its entirety for all purposes.

FIELD OF THE INVENTION

The invention relates to a method and apparatus for the time controlled activation of elements such as electrical switches, control elements, electrochromic display elements, galvanic cells and transistors.

BACKGROUND TO THE INVENTION

Conductive polymers have been studied for several years now as candidates to partly replace silicon-based electronic systems. An electrochemical transistor engineered using conductive polymers has been disclosed, for example, by Nilsson et al., *Adv. Mater.* 14, No. 1, 2002, p. 51. Moreover, an electrochemical transistor engineered using conductive polymers has been demonstrated in combination with display elements comprising conductive polymer material by P. Andersson et al., *Adv. Mater.* 14, No. 20, 2002, 1460.

Electrochemical devices implemented using conductive polymers react more slowly than those electronic devices implemented in silicon. Therefore the electrochemical devices based on conductive polymers seem suited for slow processes taking in the range of seconds, minutes, hours, days, weeks or months.

One example of the use of an electrochemical device made using conductive polymers is a display element. The display element is made from a local chemical cell in which chemical reactions can happen in a time-dependent manner. The chemical reactions could either be chemical or electrochemical in nature, and change the physical state of the apparatus in a way that the change can easily be recognised, for example as a colour change. Such electrochemical display cells are disclosed, for example, in the U.S. Pat. No. 5,930,023 (assigned to Wisconsin Label Corporation). The electrochemical display cells disclosed in this patent are arranged in layer form with two electrode layers and an electrolyte layer occupying distinct areas of a substrate. An electrolyte layer overlaps most of one electrode layer but contacts a smaller portion of the other electrode layer, which is made of a thin film. When activated, an electrochemical reaction progressively increases the area occupied by the thin-film electrode layer and progressively decreases the area occupied by the thin-film electrode layer. The thin-film electrode layer recedes at a boundary in common with the electrolyte layer and provides an irreversible indication of change at a rate governed by the electrochemical reaction. Therefore the Wisconsin Label patent makes use of the change within the display cell. The area available for activation is rather limited, though. Only areas covered by the electrode are accessible for activation. The activation depends on a flowing electrical current.

GB patent application 2 295 241 A assigned to Mino Green discloses an electrochromic display. A variable reflectivity mirror under protective glass comprises: a layer of fluorine-doped tin oxide conductor; an electrochromic transparent layer made of $WO_3$, going blue when hydrogen is introduced; a porous layer of $SiO_2/Al_2O_3$ which becomes moist on exposure to humidity; and a layer of reflective metal e. g. silver, which is porous enough to allow access of water vapour to the porous layer of $SiO_2/Al_2O_3$. The mirror's reflectivity is varied by applying an appropriate potential between the layers of fluorine-doped tin oxide conductor and the layer of reflective metal. The Green application does not disclose a permeability of an at least one activation layer along transversal direction across a surface of the at least one migration layer. The Green application does not disclose an activation of the at least one activation layer being achievable along a direction transversal to the at least one activation layer.

US patent application 2005 / 006 8 603 Al assigned to Berggren et al. discloses an electrochromic device comprising (i) at least one material that is electrically conducting in at least one oxidation state and (ii) at least one elelectrochromic material, wherein said materials (i) and (ii) can be the same or different; at least one layer of solidified electrolyte which is in direct electrical contact with said electrochromic element(s); and at least two electrodes comprising PEDOT-PSS arranged side by a side in common plane and adapted for application of a voltage therebetween. One of the said electrodes is in direct electric contact with a component selected from said electochromic element(s) and the other electrode(s) is in direct electrical contact with a component selected from said electrolyte layer(s) and said elelectrochromic element(s). Furthermore an electrochemically active element is provided which comprises a first layer comprising PEDOT-PSS mixed with an adhesion promoter, and a second layer comprising PANI the second layer being deposited on top of and in direct electrical contact with the first layer.

The Berggrin application requires require application of a voltage between at least two electrodes formed by PEDOT-PSS. Furthermore, the Berggren application does not disclose an activation of the at least one activation layer along a direction transversal to the at least one activation layer.

US patent 5,216,536 assigned to Donnelly Corporation, Holland, Michigan discloses an electrochromic device incorporating a moisture control layer comprised of either water reservoir material or water scavenger material in conjunction with a moisture permeable intermediate barrier layer within the device. The water reservoir material provides a source of water for those electrochromic stacks which require water for proper apparition. For stacks which require protection from moisture, water scavenger material may be utilized. A moisture permeable intermediate barrier layer separates the moisture control layer from the electrochromic stack. The Donnelly system aims at improving an electrochromic element. The Donnelly system does not disclose an activation of an activation layer along a direction transversal to the at least one activation layer.

SUMMARY OF THE INVENTION

The invention teaches an apparatus for activation of at least one element. The apparatus comprises at least one activation layer and at least one migration layer arranged at the at least one activation layers. The migration layer is permeable to a fluid along a transversal direction across a surface of the at least one migration layer. A change of doping level in the at least one activation layer is achievable aling a direction transversal to the least one activation layer. In use, the fluid causes a change in doping level in the at least one activation layer.

The elements connected to the apparatus can be a display element, an electrical switch, a time controlled resistor, a galvanic cell or any combination thereof. Thus the apparatus allows the activation of display elements, galvanic cells, switches, etc.

The present disclosure further relates to a method of manufacturing an apparatus for activation of at least one element. The method comprises a step of providing a substrate. The method further comprises a step of the deposition of at least one activation layer having an upper surface. The method further comprises a deposition of the at least one element on at least a portion of the upper surface of the at least one activation layer. The portion of the upper surface of the at least one activation layer in contact with the at least one element enables activating of the at least one element. The method further comprises a deposition of at least one migration layer such that the at least one migration layer is in contact with the at least one activation layer.

Once the migration layer is permeated by the fluid, the fluid establishes contact with the activation layer and thereby activates the element. The extent of activation is displayed by an edge between the portion in contact with the fluid and a portion of the activation layer not in contact with the fluid. For the portion of the activation layer that is in contact with the fluid, a change in doping level occurs. The change in doping level changes physical properties of the portion of the activation layer in contact with the fluid. Such physical properties can be a colour change, a change in electrical resistance or a change of electrical charge.

Further this change in physical properties can be used to activate elements such as a display element, an electrical switch, a time controlled resistor, a galvanic cell or any combination thereof. The activation of the display element can be switched in a time dependent way. Similarly a galvanic cell can be made accessible as an energy storage after a certain period of time has elapsed. In one aspect of the invention, it is possible to start the activation of the element automatically simply by establishing the contact of the apparatus with water vapours. Therefore the apparatus can be stored for a long period without being activated once a reservoir containing the fluid is filled. The apparatus would further display the time-temperature integral the apparatus is exposed to as well as the time it is exposed thereto. This may be of particular relevance for samples where time and temperature are critical such as for example blood samples. The change in resistance allows for the apparatus also to be used as a time dependent switch or a time controlled resistor.

The present invention differs from the prior art in that essentially the whole activation layer is available for the activation of the elements which is induced by a migrating fluid and not by an electrical current. The apparatus of the invention further allows the triggering of electrical switching after time has lapsed and is dependent on the extent of activation reached within the activation layer. The apparatus further allows the use of control functions which are governed by the extent of activation within the activation layer. The apparatus of the invention allows the implementation of a temperature dependence into the behaviour of the apparatus. The temperature dependence of the apparatus is given by the temperature dependence of the migration velocity of the fluid within the migration layer.

If the apparatus comprises a vapour travelling distance, the temperature dependence of the apparatus further depends on the temperature dependence of the vapour diffusion. The time needed to cross the vapour travelling distance is temperature dependent for the vapour portions of the fluid. Hence the apparatus can be used as an indicator of the time and temperature the apparatus is exposed to.

The present invention does not require electrodes to be functional. The mere contact of the fluid with a migration layer in contact with the activation layer or just a direct contact with the activation layer is sufficient to start the chemical reaction within the activation layer.

Another aspect of the apparatus according to the invention is a combination with elements such as chemically activated display elements or electrochromic display elements or galvanic cells. The elements can be arranged anywhere on and in contact with the surface of the activation layer. The incorporation of electrochromic display elements allows the switching of electrochromic display elements on or off. The switching can, for example, be used to display a message upon reaching a certain state of activation.

It is also possible to include galvanic elements in the apparatus that serve as an energy storage and are available upon activation of the galvanic element due to the change of the activation layer.

In combination with a radio frequency identification (RFID) system the switching effect can be used in order to switch a load resistor of a transponder on or off.

The apparatus according to the invention may be used as a time indicator that changes properties after a period of time has elapsed. This functionality of the apparatus may be used as a ticket to enter an event, the ticket changing state (appearance, colour) after a certain period has elapsed. Further such a functionality may be used to display messages containing text or image information for a limited time only. This sort of functionality may prove very valuable for the display of advertising information, albeit text or graphical information.

The apparatus may further be used as a time-temperature integrator that monitors time and temperature the apparatus was exposed to after activation. This functionality may be very useful as a "best use before" label on foods and drinks or as a use-by label for drugs. Further the apparatus could be used to display the time-temperature integral a sample was exposed to after activation. This may prove useful for diagnostic procedures as well as bodily samples for which the temperature-time integral is crucial, such as for example blood samples.

DESCRIPTION OF THE DRAWINGS

FIG. 14c shows a top view of the apparatus 1 forming a transistor of an enhancement type.

FIG. 14d shows a cross-sectional view of the apparatus 1 forming the transistor of the enhancement type.

DETAILED DESCRIPTION OF THE INVENTION

For a complete understanding of the present invention and the advantages thereof, reference is now made to the following detailed description taken in conjunction with the figures.

It should be appreciated that the various aspects of the invention discussed herein are merely illustrative of the specific ways to make and use the invention and do not therefore limit the scope of the invention when taken into consideration with the claims and the following detailed description. It will also be appreciated that features from some aspects of the invention may be combined with features from other aspects of the invention.

Figure 1A:
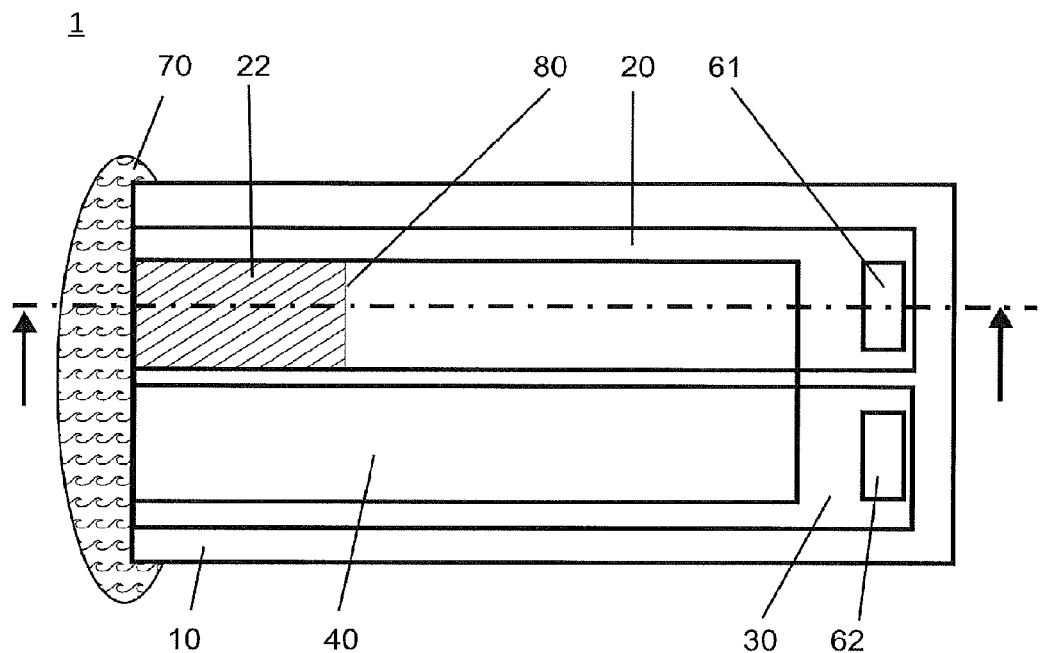
FIG. 1a shows a first aspect of the apparatus 1 with a window 52 in a top view.
Figure 1B:
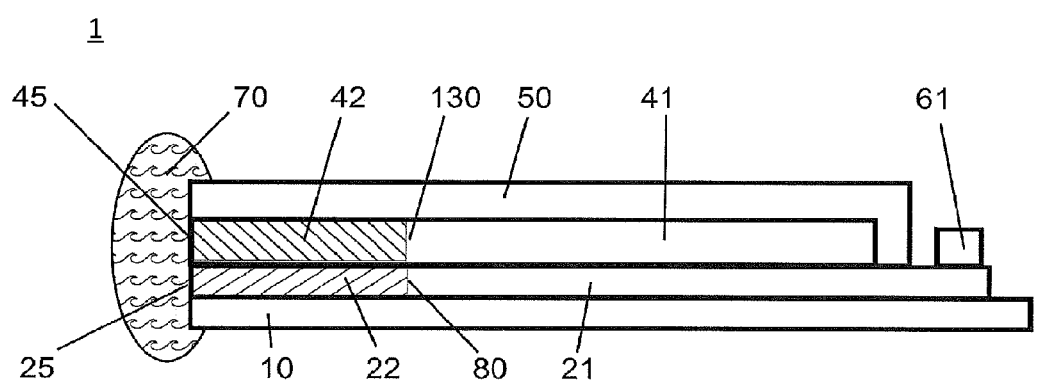
FIG. 1b shows the apparatus 1 of FIG. 1a in a cross sectional view.

FIG. 1 shows a first embodiment of an apparatus 1 according to the invention in a top view (FIG. 1a) and a cross-sectional view (FIG. 1b). The position of the cross-sectional view (FIG. 1b) is shown in FIG. 1a by means of a dashed-dotted line and a direction of the cross-sectional view is indicated by two arrows.

FIG. 1 shows a substrate 10 which is made of a material which is electrically insulating, temperature stable, resistant to organic solvents used during a manufacture of the apparatus 1 as well as to a fluid 70 as will be explained later. Without any limitation to the invention, the substrate 10 may be made of a plastic material, such as polyester, co-extruded polyethylene, polyethylene terephthalate, polyethylene naphthalene dicarboxylate, polyethylene, polyamide, polypropylene or polycarbonate. The substrate 10 could also be made of paper, coated paper, glass or ceramic. The thickness of the substrate 10 can range from a few millimeters to a few micrometers. A typical value for the thickness of the substrate would be in the range of 200 µm.

At least one activation layer 20 is arranged on a surface of the substrate 10. Two, three or more activation layers 20 could be present. A second portion 22 of the activation layer 20 is in contact with the fluid 70. A first portion 21 of the activation layer 20 is characterized by not yet being in contact with the fluid 70.

The activation layer 20 is made from an electrically conducting polymer, preferably doped polyaniline (PANI) or poly(ethylenedioxythiophene) (PEDOT) doped with polystyrene sulphonic acid (PEDOT:PSS), as well as any other electrically conducting polymer. PANI is available from Panipol in Finland as PANIPOL T [PANI is dissolved within toluene—see http://www.panipol.fi/index.php?option=content&task=view&id=3&Itemid=26, accessed on 12 Oct. 2007]. The activation layer 20 may also be made of electrically conducting poly(3,4-ethylendioxy) thiophene. The PEDOT is made from an oxidative polymerisation of the monomer ethylenedioxythiophene with iron (III)-salts being present as an oxidizing agent and is available from BAYER doped with polystyrene sulphonic acid (PSS) under the trade name Baytron P. The PSS is added during the polymerisation of PEDOT to form PEDOT:PSS. The material used is a suspension of PEDOT:PSS dissolved in water. For further information about PEDOT:PSS, reference is made to the web page http://www.hcstarck.de/index.php?page_id=602, as accessed on 12 Oct. 2007, and A. N. Aleshin, S. R. Williams, A. J. Heeger, *Synthetic Materials*, 1998, 97, p. 173.

The PEDOT:PSS-material is prepared according to a recipe given in Lu et al, *Journal of Appl. Phys.*, 2002, 92 No. 10, 6033. 5 ml of ethylene glycol are mixed with one drop of dodecylbenzenesulfonic acid (DBSA) and shaken. DBSA is available from Fluka Chemie GmbH. 1 ml of the resulting solution is mixed with 5 ml of the Baytron P solution and again stirred. The result was a dark blue solution which allows a deposition onto the substrate layer 10.

Alternatively PEDOT:PSS as a layer on the substrate 10 is available under the trade name Orgacon TM EL-350 sold by the company AGFA [see, for example, http://www.agfa.com/docs/sp/advanced_materials/Orgacon_EL-350_21006.pdf accessed on 12 Oct. 2007]. Orgacon TM EL-350 is a 175 µm thick polyester foil together with a PEDOT:PSS-layer with a sheet resistance <350 Ohm/sq.

Typically the thickness of the activation layer 20 is in the range between 50 nm and 500 nm. If the activation layer 20 further comprises composite materials, as explained below, the thickness of the activation layer 20 may be in the range of a few hundred µm. The use of nano particles or micro particles embedded into the activation layer 20 would increase the volume of the activation layer and limit the activation to a thin layer at the surface of the activation layer 20, only.

Alternatively it is possible for the activation layer 20 to comprise combinations of materials, for example successions of layers comprising PEDOT:PSS and PANI. Further it is possible to deposit polymer material onto thin metal layers. Further it is possible to implement the activation layer 20 using material that has a homogeneous doping level upon manufacture of the activation layer 20. Without any limitation it is of course possible to use activation layer material that shows a spatial variation of the doping level. So the doping level within the activation layer 20 may very well comprise step profiles of doping level or arbitrarily shaped profiles of doping level, as well as a doping level N that varies as a function of a position x within the activation layer 20 such that $N=f(x)$.

Further the activation layer 20 may comprise a thin layer of metal, such as a thin layer of aluminium. The thickness of the aluminium layer forming the activation layer 20 would be in the range of a few nm up to a few 100 nm. The aluminium layer may be formed by a thin film process. It is also possible to fabricate the aluminium layer from aluminium particles by spray coating.

An electrode 30 forms another layer on top of the surface of the substrate 10. The electrode 30 is made from PANI, PEDOT:PSS or another electrically conducting material. According to one aspect of the invention both the activation layer 20 and the electrode 30 may be made of the same electrically conducting polymer.

Further examples of the electrically conducting polymers used for the apparatus 1 include, but are not limited to, polythiophenes, polypyrroles, polyanilines, polyisothianaphtalenes, polyphenylene vinylenes, poly(para-phenylen), poly(para-phenylen-vinylen) and copolymers thereof. The copolymers are selected from poly(3,4-methylenedioxythiophene), poly(3,4-methylene-dioxythiophene) derivatives, poly(3,4-ethylenedioxythiophene), poly(3,4-ethylene-dioxythiophene) derivatives, poly(3,4-propylenedioxythiophene), poly(3,4-propylenedioxythiophene) derivatives, poly(3,4-butylenedioxythiophene), poly(3,4-butylenedioxythi-ophene) derivatives, poly-3-methylthiophene and poly-3,4-dimethylthiphene and copolymers therewith.

Further suitable materials as electrically conducting polymers used for the apparatus 1 according to this invention are a polymer or copolymer of a 3,4-dialkoxythiophene, Poly (dialkylfluorene) derivatives, cis-polyacetylen and trans-polyacetylen.

The activation layer 20 and the electrode 30 are covered by at least one migration layer 40. There may be more than one migration layers 40.

Without any limitation to the invention it is further possible to inverse the order of migration layer 40 and activation layer 20, such that the activation layer 20 is placed on top of and in a contact with the migration layer 40. In a method for manufacture of the apparatus 1 an in-line process or continuous process is used for a deposition of subsequent layers of material onto the substrate 10 to form the apparatus 1 according to the invention. The method for the deposition of the migration layer 40, the activation layer 20 and/or the electrode 30 onto the substrate 10 can be screen printing, spin coating, spray coating, pad printing and dip coating as well as combinations thereof. Patterning of the activation layer 20, migration layer 40 and/or the electrode 30 can be achieved by lithography, screen printing or using a cutting plotter.

The migration layer 40 as well as an electrolyte matrix layer 185 of a display element 220, as shown on FIG. 8, are made from a material, wherein the material is able to absorb the fluid 70. The material able to absorb the fluid 70 can be any material which can be permeated by the fluid 70. As known in the art several polymers are suitable to absorb the fluid 70.

In one example the migration layer is made of polyvinyl alcohol (PVA) as main ingredient. The migration layer 40 and the electrolyte matrix layer 185 may be produced in the following way: 0.2 g of $CaCl_2 \cdot 6H_2O$ was dissolved in 10 ml of desalted water and the resultant solution was mixed with 0.6 g of polyvinyl alcohol and stirred at 80° C. for approximately two hours to form a mixture. 0.35 g of isopropanol was added to the mixture once the mixture had cooled. This mixture was deposited onto the substrate 10 and subsequently dried. The method for the deposition of migration layer 40 onto the substrate 10 is screen printing, spin coating, spray coating, pad printing and dip coating as well as combinations thereof. Patterning of the migration layer 40, the activation layer 20 or the electrode 30 can be achieved by means of screen printing, lithography or by using a cutting plotter.

Typically the thickness of the migration layer 40 will be in the range of a few µm up to 1 cm, more preferably in the range of a few 10 µm up to a few 100 µm.

In another aspect of the apparatus 1 according to this invention the migration layer 40 may comprise an electrolyte, more preferably a gel electrolyte such as tetrabutyl ammonium hexafluorophosphate (TBAPF6)/poly(methyl metacrylate) (PMMA)/propylene carbonate (PC)/acetonitrile (ACN). If the mixture TBAPF6/PMMA/PC/ACN is used for the migration layer 40, the mixture is preferably used in a ratio of substantially 3:7:20:70 by weight.

The migration layer 40 may be solidified by means of gelatine, a gelatine derivative, starch, polyacrylic acid, polymethacrylic acid, Polyhydroxyethylmethacrylat (HEMA), poly(vinylpyrrolidone), polysaccharides, polyacrylamides, polyurethanes, polypropylene oxides, polyethylene oxides, poly(styrene sulphonic acid) and salts and copolymers thereof, in which the solidified gel electrolyte comprises an ionic salt. Further materials suitable to form the migration layer 40 or the electrolyte matrix 185 of the display element 220 are solid polymer electrolytes (SPE) such as a sulphonated tetrafluoroethylene copolymer (commercially available as Nafion®), poly (styrene sulphonic) acid (PSSH) or poly (ethylene oxide) (PEO).

Additionally to the aforementioned electrolytes used within the migration layer 40 or the electrolyte matrix layer 185, any other electrolyte may be used for example $LiClO_4$ solved within acetonitrile or citric acid (0.01 M to 1 M) or NaOH (0.01 M to 1 M) solved in water.

The migration layer 40 containing citric acid or NaOH is dried after fabrication. After activation the migration layer 40 is permeated by an electrolyte containing an acid or a base due to the sorption of water. The electrolyte containing the acid or the base is of interest for chemical doping of the activation layer 20.

A temperature dependence of the migration process in the migration layer 40 depends on the composition of the migration layer 40. For example it is possible to increase a salt content (e.g. $CaCl_2$) or a content of a citric acid or a content of NaOH to influence the temperature dependence of the migration process in the migration layer 40.

Moreover, materials suitable to form the migration layer 40 can also include capillary substances capable of the absorption of an electrolyte. Such capillary substance include, but are not limited to, paper, chromatography paper, a thin layer of adsorbent material (e.g. silica gel), aluminium oxide, or cellulose. For the migration layer 40 comprising capillary materials the thickness of the migration layer 40 ranges between 10 µm and a few 100 µm.

It is also possible in some aspects of the invention to use combinations or composite materials comprising the above materials and capillary substances. In order to control the properties of the permeation within the migration layer 40 it is possible to use materials comprising microparticles or nanoparticles as components of the migration layer 40. Preferably the microparticles or nanoparticles within the migration layer 40 are titanium oxide or silicon oxide.

It is also possible to form the migration layer 40 as a multilayer. For example the migration layer 40 may comprise a first layer formed from a neutral PVA solution and comprise a second layer formed from a PVA solution with a citric acid or NaOH. The first layer and the second layer are on top of each other.

It is even possible to compose the migration layer 40 from segments with a different composition. For example a first segment of the migration layer 40 may contain NaOH, whereas a second segment of the migration layer 40 does not contain NaOH. The different composition is also possible for other components of the apparatus 1.

It is further possible for the migration layer 40 to be formed by means of a delaminating process triggered when using the apparatus 1. According to such an aspect of the apparatus 1 the migration layer 40, for example comprising PVA, may be omitted. The delaminating process may occur between the encapsulating layer 50 and the activation layer 20 and be triggered by the contact of the electrolyte with the encapsulating layer 50 and the activation layer 20. After the delaminating process of the activation layer 20 and the encapsulating layer 50 the electrolyte may permeate as a thin film of fluid 70 between the activation layer 20 and the encapsulating layer 50. This slow process of permeation constitutes a migration process. Hence the migration layer according to such a delaminating process is self forming between the phase boundaries of activation layer 20 and encapsulating layer 50. Likewise a delaminating process may occur between the activation layer 20 and the substrate 10.

It is also possible to merge the migration layer 40 and the activation layer 20. The merging of the activation layer 20 and the migration layer 40 can be implemented using any activation layer material suitable to absorb the fluid 70. The sorption or absorption of the fluid 70 can be enhanced by blending the material of the activation layer 20 with the material of the migration layer 40. One example of blended material of the activation layer 20 and the migration layer 40 is a PANI/PVA composite.

FIG. 1 also shows a first contact layer 61 on and in contact with the activation layer 20. The electrode 30 is in contact with a second contact layer 62 which is arranged on a top surface of the electrode 30. The first contact layer 61 and the second contact layer 62 may be made of silver paste. The first contact layer 61 and the second contact layer 62 may be omitted from the apparatus 1. The purpose of the first contact layer 61 and the second contact layer 62 is to apply a potential difference between the activation layer 20 and the electrode 30. The migration layer 40 is covered or sealed by an encapsulating layer 50 leaving at least an exposed edge 45 of the migration layer 40 exposed. The exposed edge 45 is shown in FIG. 1b as a left hand edge. The selection of the left hand edge as the exposed edge 45 is arbitrary. In FIG. 1a the encapsulating layer 50 is not shown for better clarity of the figure. The encapsulating layer 50 is made from a lacquer coating that is applied to cover at least the activation layer 20 and the migration layer 40. The encapsulating layer 50 may further comprise a layer of lacquer based on an acrylic resin or an acrylic resin copolymer. Additionally any other combination of materials that sufficiently seal the apparatus 1 and also stick to the surface of the apparatus 1 would be suitable. To deposit the encapsulating layer 50 onto the apparatus 1 it is possible to use the same methods as for the deposition of the activation layer 20 or the migration layer 40. The methods for the deposition of the activation layer 20 and the migration layer 40 are described above. Typically the thickness of the encapsulating layer 50 is in the range of a few µm up to 1 cm, more preferably within the range of a few 10 µm up to a few 100 µm. It is also possible to form the encapsulating layer 50 by a heat sealing film.

FIG. 1b shows the exposed edge 45 of the migration layer 40 on the left hand edge of apparatus 1 together with an exposed edge 25 of the activation layer 20. The exposed edge 25 of the activation layer 20 can be omitted. In FIG. 1b both of the exposed edge 45 and the exposed edge 25 may be in contact with the fluid 70. Most conveniently, this fluid 70 can be water vapour, liquid water or a water based electrolyte.

An activation of the apparatus 1 is established by creating a contact of the exposed edge 45 of the migration layer 40 with the fluid 70. This contact defines a point in time for the initiation of the activation of the apparatus 1. A permeation of the fluid 70 starts within the migration layer 40 with the activation of the apparatus 1.

In one aspect of the invention, the fluid 70 may comprise water vapour and the migration layer 40 comprises PVA. The migration layer 40 may also have salt crystals embedded within the migration layer 40. The PVA is capable of absorbing water and, as a result, the PVA is partially dissolved and the water-based electrolyte permeates the migration layer 40 up to a limit 130. In FIG. 1b, the fluid 70 is shown as having travelled within a second portion 42 of the migration layer 40. A first portion 41 of the migration layer 40 has no contact with the fluid 70. The second portion 42 of the migration layer 40 is shown as a hatched area in FIG. 1b. The limit 130 is between the first portion 41 and the second portion 42. Alternatively, water or a water based electrolyte may be brought into contact with the migration layer 40.

In FIG. 1 the portion of the fluid 70 that has travelled to the limit 130 within the second portion 42 of the migration layer 40 comes in contact with a second portion 22 of the activation layer 20 and with the portion of the electrode 30 being covered by the second portion 42 of the migration layer 40. The contact between the fluid 70 within the second portion 42 of the migration layer 40 and the second portion 22 of the activation layer 20 establishes a local chemical cell in which a chemical reaction or an electrochemical reaction can be triggered. The chemical reaction as well as the electrochemical reaction will cause a change in doping level within the second portion 22 of the activation layer 20 as part of the local chemical cell.

The term "change in doping level" may also refer to a change in an oxidation state of the activation layer 20. The change in doping level is, for example, an oxidation of the activation layer 20 or a reduction of the activation layer 20. So when the activation layer 20 comprises aluminium the oxidation of aluminium to aluminium oxide is the change in doping level.

If, for example, the electrode 30 and the activation layer 20 are made of the same material (for example, PEDOT:PSS), then the electrochemical reaction may be triggered via a bias voltage (for example 1.5 volts) applied between the contact layer 61 and the contact layer 62.

If, for example, the electrode 30 is connected as an anode and the activation layer 20 is connected as a cathode, an electrochemical reduction within the second portion 22 of the activation layer 20 is caused. The electrochemical reduction changes the doping level within the second portion 22 of the activation layer 20. The change in doping level further leads to an electrochromic colour change which changes the colour of the second portion 22 of the activation layer 20 to dark blue. In FIG. 1a the reduced portion of the second portion 22 of the activation layer 20 is shown as hatched area together with the edge 80 of the second portion 22 of the activation layer 20. The travelling edge 80 between the second portion 22 and the first portion 21 of the activation layer 20 moves with the growth of the second portion 22 of the activation layer 20.

The apparatus 1 can be used as a time indicator. The time indicator is implemented marking the position of the elapsed time after the point in time of activation by the position of the travelling edge 80 of the electrochemically changed second portion 22 of the activation layer 20, as is shown in FIG. 1c.

It is also possible to use the apparatus 1 to determine a time-temperature integral. The time-temperature integral is implemented by ensuring that a velocity of the migration of the fluid 70 within the second portion 42 of the migration layer 40 depends on the temperature of the apparatus 1.

Figure 1C:
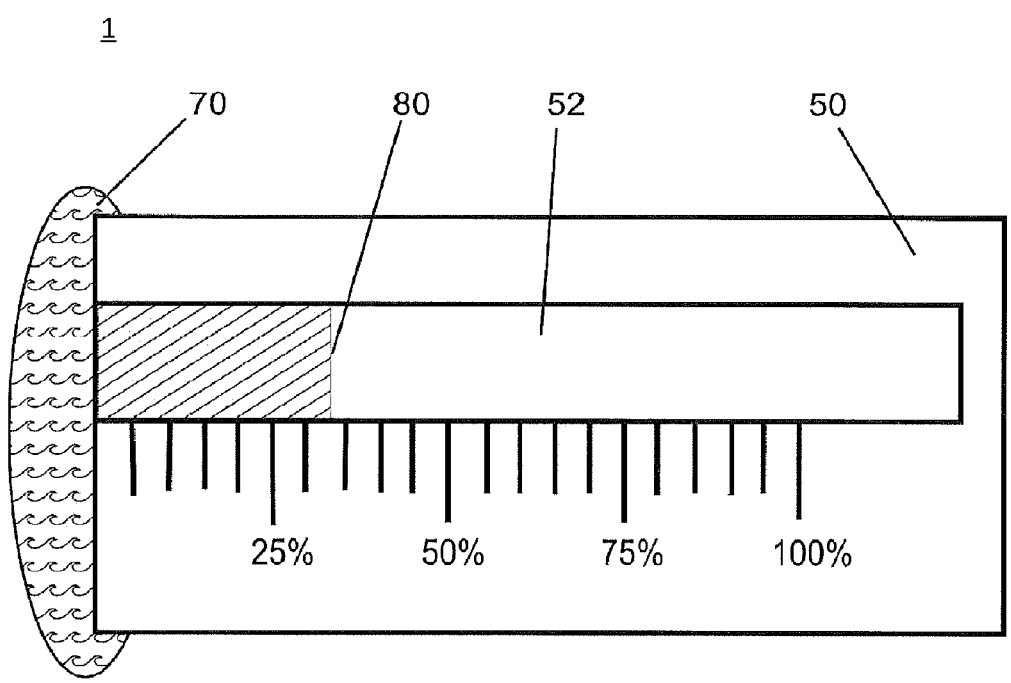
FIG. 1c shows the apparatus 1 of FIGS. 1a and 1b in use.

The apparatus 1 according to FIGS. 1a and 1b may have the encapsulating layer 50 arranged as shown in FIGS. 1b and 1c. If the encapsulating layer 50 further comprises a window 52, it is possible to observe the travelling edge 80 of the second portion 22 of the activation layer 20 as the second portion 22 of the activation layer 20 changes colour due to the chemical reaction or the electrochemical reaction causing the change in doping level. The use of an optical display with the window 52 on the upper surface of the substrate 10 requires the materials positioned between the window 52 and the activation layer 20 to be transparent materials.

The encapsulating layer 50 may also be formed on the apparatus 1 on an underside of the substrate 10. In another aspect of the invention it is possible for the window 52 to be printed onto the substrate 10 on the underside of the substrate 10. The use of an optical display with the window 52 on the bottom side of the substrate 10 requires the materials positioned between the window 52 and the activation layer 20 to be transparent materials. In this case, transparent materials are used for the substrate 10, for the activation layer 20 and the encapsulating layer 50. The window 52 is still visible from top of the apparatus 1, although the window 52 has been printed underneath the substrate 10.

According to a further aspect of the invention in which the activation layer 20 is made from PEDOT:PSS, the change in doping level within the second portion 22 of the activation layer 20 causes not only the colour change but moreover an increase in electrical resistance. The increase in electrical resistance can be used to trigger an electrical switch once a defined time after the point in time of the activation has elapsed. The use of the electrical switch is shown in more detail in FIGS. 2a and 2b.

Figure 2A:
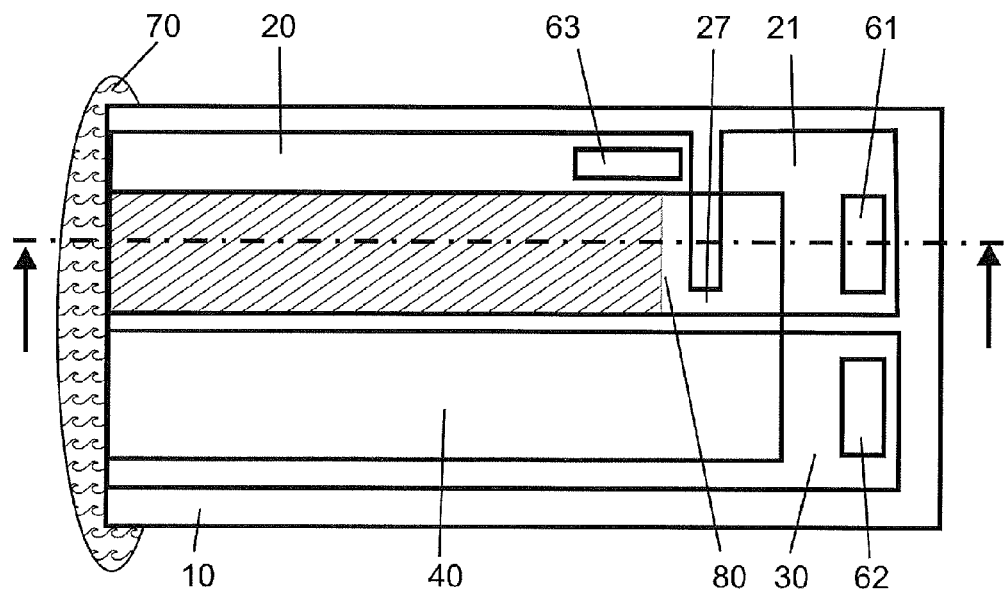
FIG. 2a shows a second aspect of the apparatus 1 comprising a narrow portion 27 within the activation layer 20 in a top view.
Figure 2B:
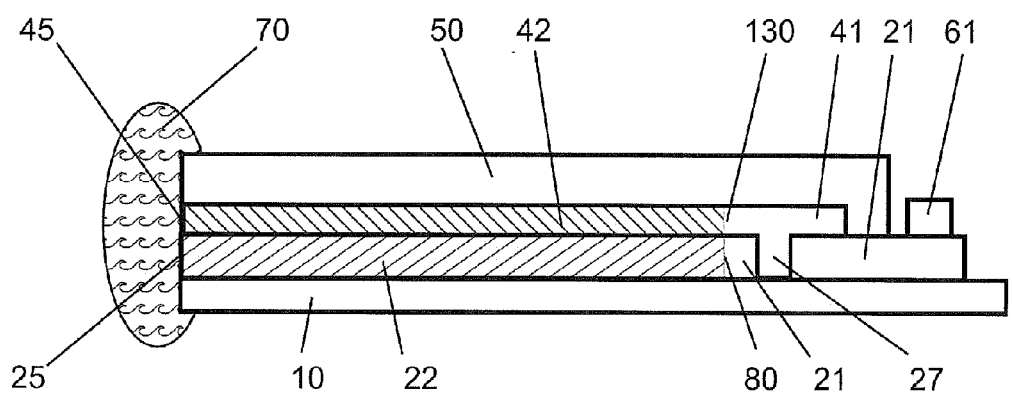
FIG. 2b shows the apparatus 1 of FIG. 2a in a cross-sectional view.

FIGS. 2a and 2b show the same apparatus 1 as FIGS. 1a and 1b. The activation layer 20 within the FIGS. 2a and 2b has not only a first portion 21 and a second portion 22, but additionally a narrow portion 27. In the narrow portion 27 the width of the activation layer 20 is reduced with respect to the other parts of the activation layer 20. A further contact layer 63 is also present which is in contact with the activation layer 20 as shown in FIG. 2a. The encapsulating layer 50 is not shown within FIG. 2a to improve the clarity of FIGS. 2a and 2b.

Figure 2C:
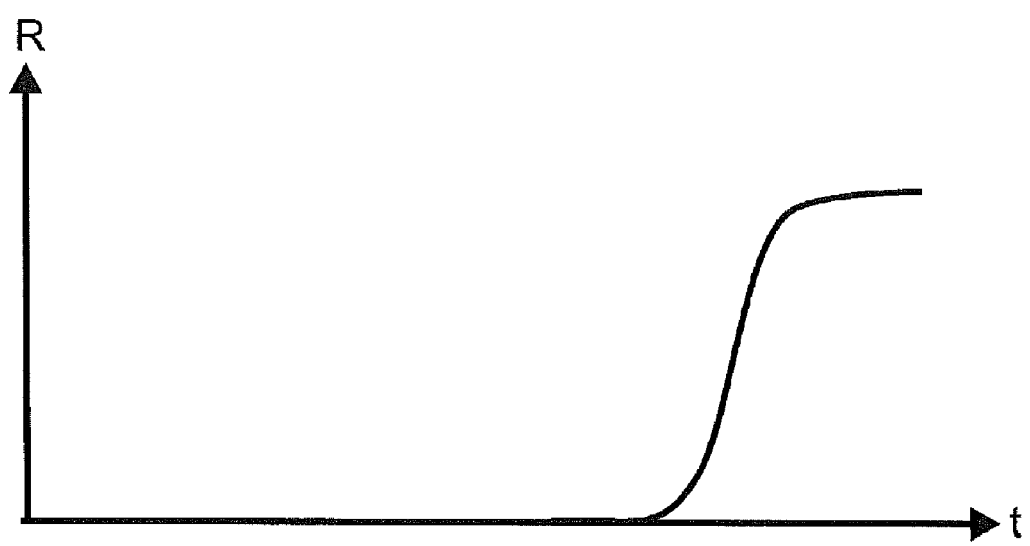
FIG. 2c shows the resistance characteristics for the apparatus 1 of FIGS. 2a and 2b.

The activation of the apparatus 1 as shown in FIG. 2 is achieved in the same way as described in FIG. 1. The fluid 70 comes into contact with the migration layer 40. In FIG. 2 the second portion 42 of the migration layer 40 is the portion already in contact and permeated by the fluid 70 and is shown as hatched area. The extent of permeation within the second portion 42 of the migration layer 40 is only shown within FIG. 2b for purposes of clarity of the figures. The fluid 70 comes into contact with the activation layer 20 and the second portion 22 of the activation layer 20 is formed.

If the electrode 30 and the activation layer 20 within FIG. 2 comprise the same material, preferably for example PEDOT:PSS, then the electrochemical reaction may be triggered via a bias voltage (for example 1.5 volts) across the further contact layer 63 and the second contact layer 62, as described above. It may prove convenient to connect the further contact layer 63 as the cathode and the second contact layer 62 as the anode The electrochemical reduction takes place within the second portion 22 of the activation layer. The electrochemical reduction gives rise to the electrochromic colour change that changes the colour of the second portion 22 of the activation layer 20 to dark blue. This electrochemically reduced portion 22 of the activation layer 20, arranged underneath and in contact with the migration layer 40, is displayed together with the travelling edge 80 in FIGS. 2a and 2b.

If the travelling edge 80 of the electrochemically reduced second portion 22 of the activation layer 20 passes the narrow portion 27, this passage of the travelling edge 80 will give rise to an increase in electrical resistance. The increase in electrical resistance can be measured across the first contact layer 61 and the further contact layer 63. The steepness dR/dt of the increase in electrical resistance depends on the velocity of permeation of the fluid 70 within the migration layer 40 and further the width of the narrow portion 27. The width of the entire migration layer 40 lies in the range between 1 μm and a few millimeters, and the width of the narrow portion 27 between 1 μm and a few 100 μm.

Moreover the steepness dR/dt of the increase in resistance depends on a velocity at which the migration layer 40 is permeated or dissolved upon contact with the fluid 70.

It is possible for the narrow portion 27 not only to be orientated perpendicular to the direction of permeation of the fluid 70 within the second portion 42 of the migration layer 40. The narrow portion 27 may alternatively be orientated in a direction parallel to the direction of permeation within the second portion 42 of the migration layer 40. This aspect of the apparatus 1 is shown on FIG. 7. FIG. 7 illustrates the narrow portion 27 within the activation layer 20 which is orientated in a direction parallel to the direction of the permeation of the fluid 70 within the migration layer 40. A change in electrical resistance can be used for the process of electrical switching. One example of the use of the apparatus 1 would be to switch an electrochromic display element 220 on or off. It is also possible to use the change in electrical resistance to induce a load modulation, for example in an RFID (Radio Frequency Identification) system. A supporting structure for the RFID module is needed. It may be convenient to use the substrate 10 as the supporting structure. The load modulation over time is present across the first contact layer 61 and the further contact layer 63.

In another aspect of the invention a control function may be based on changes in the electrical resistance. The change in electrical resistance might either be continuous or due to a geometry of the edges of the activation layer 20. Different ones of the geometry of the activation layer 20 lead to different dependencies of the slope dR/dt with time. This is illustrated in FIG. 3c.

Figure 3A:
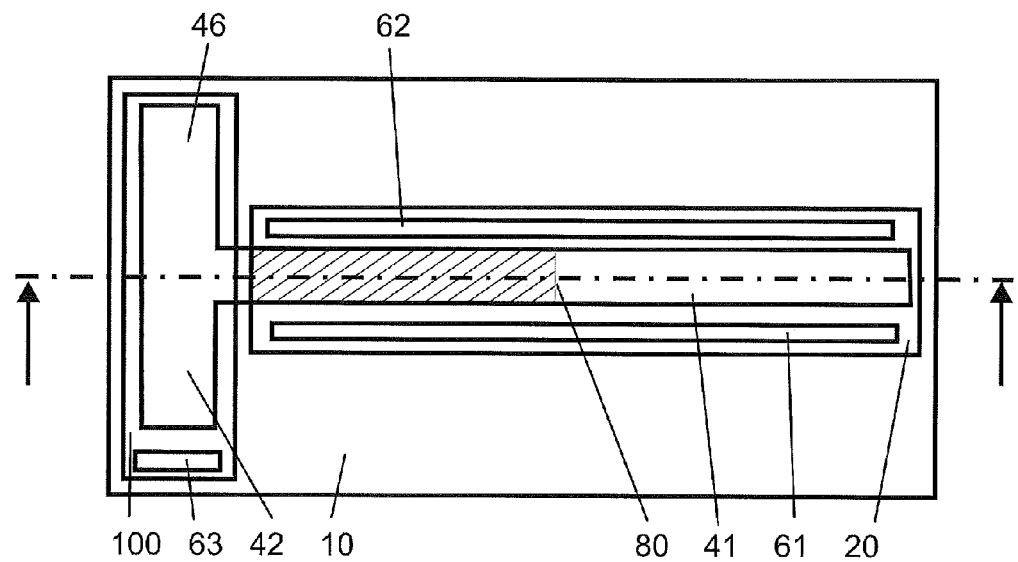
FIG. 3a shows the apparatus 1 with an exposed area 46 of the migration layer in top view.
Figure 3B:
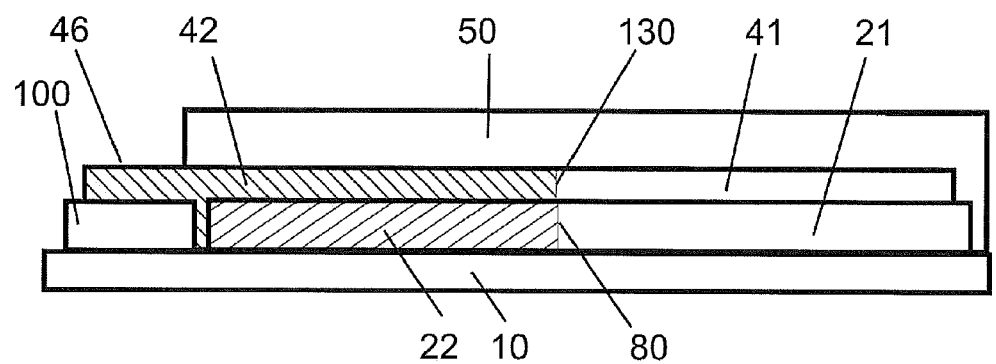
FIG. 3b shows the apparatus 1 with an exposed area 46 of the migration layer in a cross-sectional view.
Figure 3C:
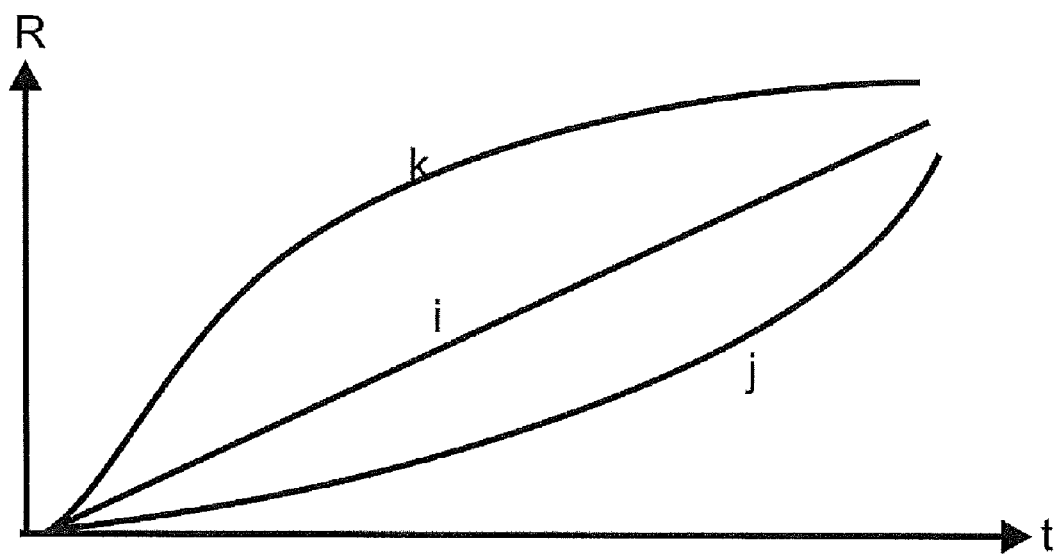
FIG. 3c shows various resistance characteristics.

FIG. 3 shows a top view (FIG. 3a) and a cross-sectional view (FIG. 3b) of the apparatus 1 of the invention. The position of the cross-section is indicated by the dash-dotted line and the direction of view is further indicated by means of two arrows in FIG. 3a. The activation layer 20 extends on the substrate 10. The first portion 21 of the activation layer 20 is not yet in contact with the fluid 70. The second portion 22 of the activation layer 20 has already established contact with the fluid 70. An additional layer on the substrate 10 comprises an electrode 100 which may comprise the same material as the activation layer 20. The activation layer 20 and the electrode 100 are covered by a t-shaped migration layer 40 comprising a permeated second portion 42 and a non-permeated first portion 41. Contact layers 61 and 62 extend on top of and in contact with the activation layer 20. A further contact layer 63 is present on the electrode 100. The contact layers 61, 62, 63 are made, for example, from conductive silver paste. The contact layers 61, 62 and 63 can be omitted. The contact layers 61, 62 and 63 help contact the activation layer 20 or the electrode 100 and facilitate the application of a potential difference. The migration layer 40 is partly covered with the encapsulating layer 50, leaving an exposed area 46 of the migration layer 40 uncovered. In FIG. 3a for clarity purposes the encapsulating layer 50 is not shown.

A deposition of the fluid 70 (not shown in FIG. 3) onto the exposed area 46 of the migration layer 40 defines the commencement of the point in time of activation of the apparatus 1. The exposed area 46 may be sealed using an epoxy resin or a sticky tape once the fluid 70 is deposited onto the exposed area 46. The fluid 70 starts to permeate within the migration layer 40 after the activation of the apparatus 1. The electrolyte permeates the PVA within the migration layer 40 up to the border 130. As disclosed above, the fluid 70 dissolves the PVA layer within the migration layer 40. Again for the clarity of the drawings the permeation is only shown in FIG. 3b.

After the electrolyte has permeated the migration layer 40 up to the limit 130, the electrolyte is now in contact with both the second portion 22 of the activation layer 20 lying underneath the migration layer 40 as well as with the electrode 100. This forms the local electrochemical cell within which chemical reactions and/or electrochemical reactions may be triggered. As discussed above, the order of the activation layer 20 and the migration layer 40 may be reversed, so that the activation layer 20 is on top of the migration layer 40. This order of activation layer 20 and migration layer 40 is possible for all arrangements of migration layer 40 and activation layer 20. It is sufficient that the activation layer 20 and the migration layer 40 are in contact with each other.

If, as according to the aspect of the apparatus 1 shown in FIG. 3, the electrode 100 comprises the same material as the activation layer 20 then the electrochemical reaction may be triggered by applying a bias voltage across the contact layer 61 (or 62) and the contact layer 63, whereby the contact layer 63 is in contact with the electrode 100. If the electrode 100 is connected as the anode and the activation layer 20 is connected as the cathode, this bias voltage gives rise to an electrochemical reduction of the activation layer 20. The electrochemical reduction further leads to the increase in electrical resistance across the contact layers 61 and 62, together with the electrochromic colour change that changes the colour of the second portion 22 of the activation layer 20 to dark blue. In FIGS. 3a and 3b the reduced portion 22 of the activation layer 20 and the travelling edge 80 as well as the non-reduced portion 21 of activation layer 20 are indicated.

Figure 5A:
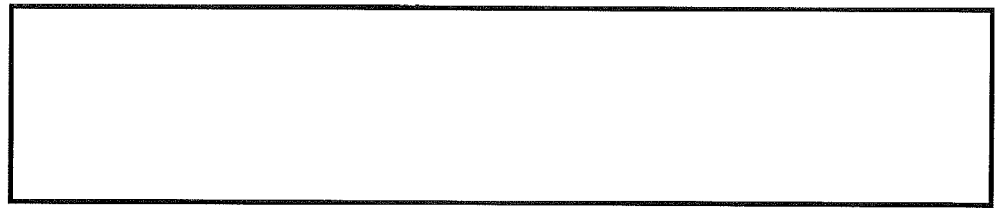
FIG. 5a shows a rectangular shaped activation layer.
Figure 5B:
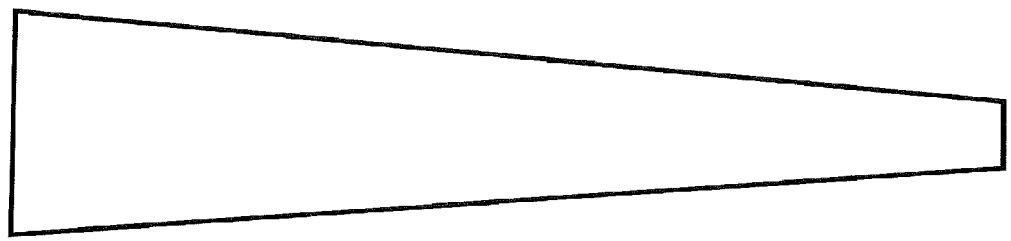
FIG. 5b shows an activation layer 20 with decreasing width from left to right.
Figure 5C:
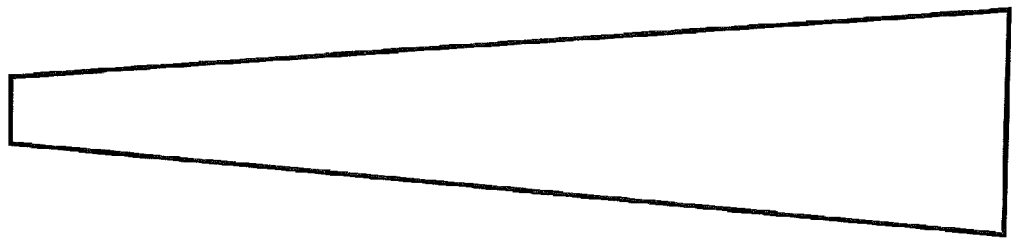
FIG. 5c shows an activation layer 20 with decreasing width from right to left.
Figure 5D:
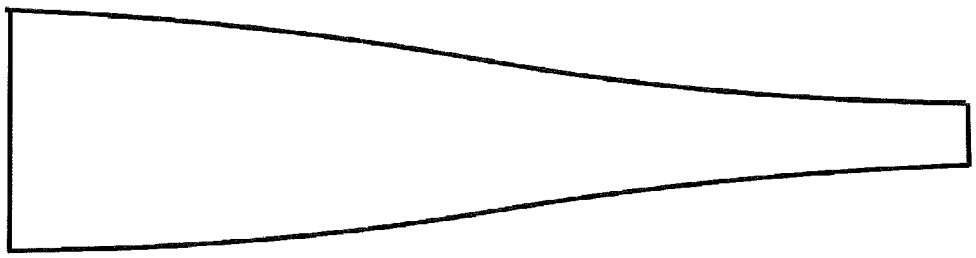
FIG. 5d shows a curved activation layer 20 with decreasing width from left to right.
Figure 5E:
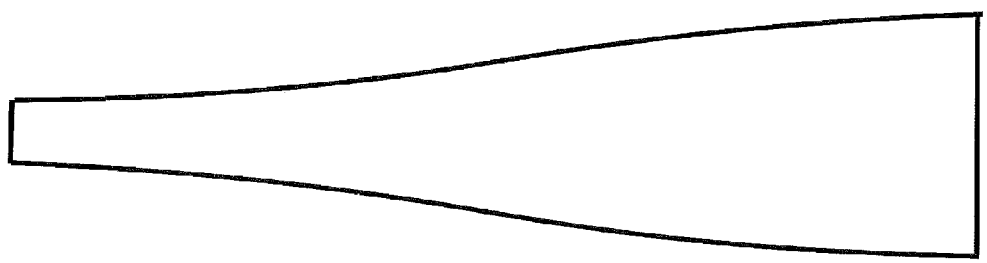
FIG. 5e shows a curved activation layer 20 with decreasing width from right to left.

FIG. 3c illustrates the electrical resistance measured across the contact layers 61 and the contact layer 62 as a function of time t. The behaviour of the resistance R over time R(t) follows the characteristics shown in curve i if the activation layer 20 as shown in FIG. 3a and FIG. 5a comprises parallel edge contours. The R(t)-behaviour follows the curve j if the edge contours of the activation layer 20 show a reducing profile from left to the right as depicted in FIG. 5b or 5d. The R(t)-behaviour follows the contour k for edge contours as shown in FIG. 5c or 5e. This invention allow for the use of arbitrarily shaped edge contours, such that different edge contours lead to different R(t)-behaviours.

Figure 4A:
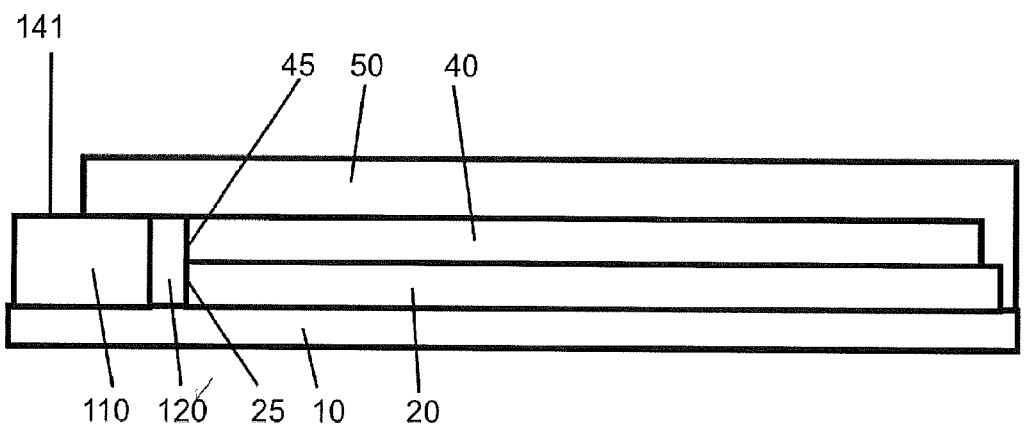
FIG. 4a shows the apparatus 1 with a fluid container 110 and a vapour travelling distance 120 and an exposed surface area 141 on a surface of the fluid container 110.

FIG. 4a shows another aspect of the apparatus 1 according to the invention. The apparatus 1 further comprises a vapour travelling distance 120 which is shown in a cross-sectional view. A portion of the migration layer 40 has merely been replaced by the vapour travelling distance 120. The vapour travelling distance 120 is formed as a hollow volume. At least one of the limits of the vapour travelling distance 120 is in contact with either the exposed edge 45 of the migration layer 40 or, as shown in FIG. 4a, in contact with both the edge 25 of the activation layer 20 and the exposed edge 45 of the migration layer 40. The fluid 70 travels across the vapour travelling distance 120 by means of a vapour diffusion. The vapour travelling distance 120 may conveniently be formed by providing a hole or a gap within the migration layer 40. Additionally it is possible for the vapour travelling distance 120 to be formed by a volume comprising a material that is permeable to the vapour portions of the fluid 70. Such materials permeable to the vapour portions of the fluid 70 include but are not limited to blotting paper, paper, chromatography paper etc.

The vapour travelling distance 120 within this aspect of the invention disclosed in FIG. 4 allows for a time dependent and further allows for a pronounced temperature dependent behaviour of the apparatus 1. The pronounced temperature dependent behaviour of the apparatus 1 is an additional feature compared to the time and temperature dependent behaviour of the apparatus 1 as disclosed in FIGS. 1 to 3. The temperature dependence of the migration of the fluid 70 as disclosed within FIGS. 1 to 3 only shows a mild temperature dependence compared to the temperature dependence for the apparatus 1 of FIG. 4 further comprising a vapour travelling distance 120. The pronounced temperature dependence of the apparatus 1 of FIG. 4 stems from the pronounced temperature dependence of the vapour diffusion across the vapour travelling distance 120. Hence the change in doping level within the second portion 22 of the activation layer 20 of the apparatus 1 depends on the temperature in a pronounced way. It is therefore possible to determine the temperature-time-integral to which the apparatus 1 of FIG. 4 comprising a vapour travelling distance 120 is exposed.

The apparatus 1 of FIG. 4a is substantially the same as the apparatus shown in FIGS. 1 to 3 except that the substrate 10 further comprises the vapour travelling distance 120 and a fluid container 110. This fluid container 110 may be made of PVA or blotting-paper. Preferably the fluid container 110 comprises a polymer material. More preferably the fluid container 110 comprises the polymer used for the migration layer 40. Even more preferably the fluid container comprises a combination of blotting paper and PVA. The fluid container 110 is deposited onto the substrate 10 as a bulk layer. If the fluid container 110 and the migration layer 40 comprise the same material, it may prove convenient during manufacture of the apparatus 1 to deposit the fluid container 110 together with the migration layer 40 in a single step of deposition.

The fluid container 110 is partly covered by the encapsulating layer 50. An exposed surface area 141 is present on a surface of the fluid container 110 not covered by the encapsulating layer 50. If the exposed area 141 comes into contact with the fluid 70 such as water, not shown in the figure, then the fluid 70 will permeate the volume of the fluid container 110.

The fluid 70 that permeates the volume of the fluid container 110 comes into contact with the vapour travelling distance 120. The vapour from the fluid 70 crosses the vapour travelling distance 120 by means of vapour diffusion and comes into contact with the exposed edge 45 of the migration layer 40. By permeating the second portion 42 of the migration layer 40 the fluid 70 comes into contact with the second portion 22 of the activation layer 20 which triggers the chemical or electrochemical reaction. Note, the second portion 22 of the activation layer 22 as well as the second portion 42 of the migration layer 40 are not shown within FIG. 4.

The time or rather the time-temperature-behaviour of the apparatus 1 depends on the velocity of migration of the fluid 70 within the migration layer 40 and further on the temperature dependence of the vapour diffusion along the vapour travelling distance 120. The temperature behaviour of the apparatus 1 can be tuned by varying parameters such as a velocity of migration within the migration layer 40 or the temperature dependence of the vapour diffusion. Geometrical parameters to adjust the time and/or time-temperature dependence of the apparatus 1 are: the volume of the fluid container 110, the surface area of the wall that delimits the vapour travelling distance 120 as well as the exposed area 46 (as in FIGS. 3a and b of the migration layer 40, the exposed edge 45 of the migration layer 40; the thickness of the migration layer 40 and the length and the volume of the vapour travelling distance 120. The optimisation of the listed parameters is relevant for the use of the apparatus 1 as time-indicator or as temperature-time-integrator.

Further composite materials or capillary materials may be used within the migration layer 40. Even combinations of the further composite materials or capillary materials with the polymer, for example PVA, are possible.

Such capillary substances include, but are not limited to, paper, chromatography paper, a thin layer of adsorbent material (e.g. silica gel), aluminium oxide, or cellulose. Additionally it is possible to have nano particles or micro particles embedded within the PVA material. The nano particles or micro particles may comprise but are not limited to silicon oxide or titanium oxide. The use of composite materials for the migration layer 40 may help to optimize the time-behaviour or the time-temperature-behaviour of the apparatus 1.

Figure 4B:
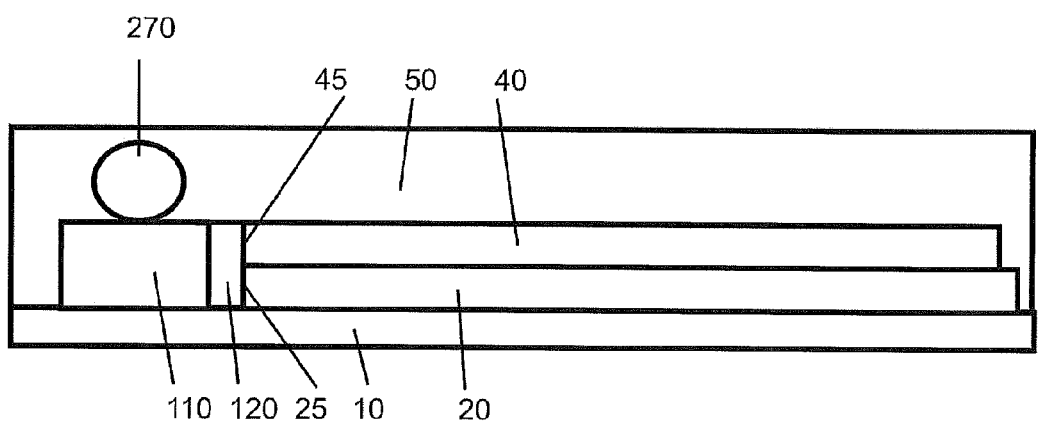
FIG. 4b shows the apparatus 1 with the fluid container 110, the vapour travelling distance 120 and a capsule 270 comprising a fluid 70.

The apparatus 1 of FIG. 4a has been modified in FIG. 4b. In FIG. 4b on top of the fluid container 110 there is a capsule 270 comprising the fluid 70 in contact with the fluid container 110. The skin of the capsule 270 is breakable. If sufficient pressure is exerted on top of the capsule 270, the skin of the capsule 270 is ruptured and the fluid 70 comes into contact with the fluid container 110. This contact triggers the activation of the apparatus 1 as described in FIG. 4a. In an aspect of the apparatus 1 the skin of the capsule 270 may be selected such that sufficient pressure to rupture the skin of the capsule 270 can be exerted by a person using a finger.

The capsule 270 may be made from glass, plastic or any other material that contains the fluid 70 in a safe way and is easily broken by application of a pressure, so that the pressure applied to the capsule 270 just causes the skin of the capsule to rupture.

The vapour travelling distance 120 in FIG. 4 can also be omitted. In case of omitting the vapour travelling distance 120, the fluid container 110 is in contact with the exposed edge 45 of the migration layer 40. It is also possible that the fluid container 110 is an extension of the migration layer 40. If the fluid container 110 contains a component which can be solved and transported by the fluid 70, a chemical reaction can be caused in the activation layer 20.

In another example, the activation layer 20 comprises PANI in the form of an emeraldine salt (green) and the fluid container 110 contains 0.5 M NaOH. After activation an aqueous NaOH solution permeates the migration layer 40 and transforms PANI by chemical reaction into an emeraldine base form (blue) of PANI.

In a further example the activation layer 20 comprises PANI in the form of an emeraldine base (blue) and the fluid container 110 contains a 0.5 M citric acid. After activation an aqueous solution of the citric acid permeates the migration layer 40 and transforms PANI by chemical reaction into an emeraldine salt form (green) of PANI.

FIG. 5 shows different ones of the edge geometries for the migration layer 40. The contour shown in FIG. 5a, for example, corresponds to the contours of migration layer 40, as discussed with respect to FIGS. 1 to 3. FIGS. 5b and 5d show edge contours which are of reducing width from left to right. FIGS. 5c and 5e show edge contours which are of increasing width from left to right. In FIG. 5f, the migration layer 40 is shown as being split into smaller sub elements. The sub elements of activation layer 40 are covered by the encapsulating layer 50, such that for each migration layer element 40 the left hand edges and the right hand edges as well as the top edges are covered by the encapsulating layer 50. This arrangement of elements of the activation layer 40 forms a plurality of the vapour travelling distances 120a. The plurality of vapour travelling distances 120a has the same effect as the vapour travelling distance 120 in FIG. 4. The velocity of the change in doping level does not only depend on the velocity of migration of the fluid 70 within the migration layer elements 40 if the migration layer 40 comprises a plurality of migration layer elements. The velocity of the change in doping level is influenced also by the velocity of vapour diffusion within the plurality of vapour travelling distances 120a if the activation layer 40 comprises a plurality of activation layer elements. In an aspect of the apparatus 1 comprising a plurality of vapour travelling distances 120a according to FIG. 5f, a single vapour travelling distance is formed between neighbouring migration layer 40 elements. With the apparatus 1 according to FIG. 5f it is possible to adjust the temperature-time behaviour of the apparatus 1 as has been disclosed with respect to FIG. 4.

Figure 5F:
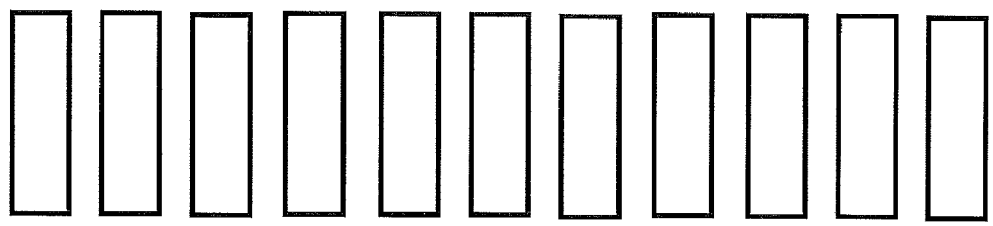
FIG. 5f shows an activation layer comprising segments spaced apart from each other.

It is possible for the migration layer 40 in FIG. 5b to FIG. 5e to be divided into a plurality of subdivisions of the migration layer 40, as shown in FIG. 5f, wherein the migration layers 40 are further separated into subdivisions of migration layer portions.

All activation layers 20 and migration layers 40 disclosed so far had continuous, even straight edge contours. Without any limitation to the apparatus 1 the activation layer 20 as well as the migration layer 40 may very well comprise non-continuous edge contours, such that the edge contours follow a spiral trajectory, a meandering trajectory, a trajectory comprising sharp corners. Typically the length of activation layers 20 and/or migration layers 40 ranges from a few 100 µm up to a few centimeters. Typically the width of migration layers 40 and/or activation layer 20 range from a few µm to a few millimeters.

Figure 6:
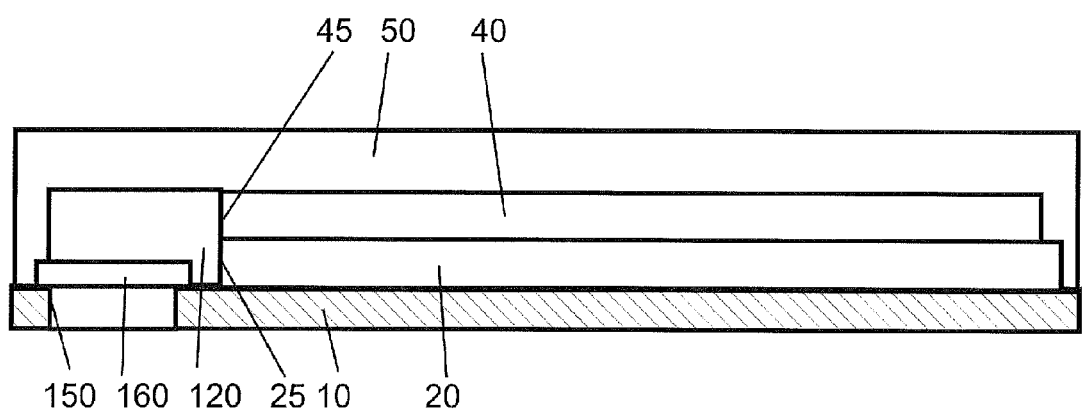
FIG. 6 shows the apparatus 1 comprising a membrane 160 and a vapour travelling distance 120.

FIG. 6 shows the apparatus 1 comprising a gas-permeable membrane 160 in a cross-sectional view. The selection of the material for the gas-permeable membrane 160 is dependent on the permeability of the gas-permeable membrane 160 for the vapour of the solvent of the electrolyte. The liquid solvent (the liquid portions of the fluid 70) may not be allowed to cross the gas-permeable membrane 160. Expanded PTFE is known for excellent water vapour permittivity together with a good resistance behaviour for water and is thus suitable as the gas-permeable membrane 160 [see http://www.gore.com/en_xx/products//electronic/battery/datasheet_gas_diffusion_membranes .html, as accessed on 15 Oct. 2007]. It is also possible to use for the gas-permeable membrane 160 silicone and rubber materials. The layer thickness of the gas-permeable membrane 160 may conveniently be in the range of a few μm to a few 100 μm.

The substrate 10 comprises an opening 150 which is sealed by the gas-permeable membrane 160. The cross-section of the substrate 10 is shown as hatched area within FIG. 6. The activation layer 20 is covered by the migration layer 40. The migration layer 40 may comprise polyvinyl alcohol (PVA). The migration layer 40 has an exposed edge 45 that is in contact with the vapour travelling distance 120. The vapour travelling distance 120 is implemented as an empty volume that is completely covered by the encapsulating layer 50.

If the gas-permeable membrane 160 comes into contact with water vapour from underneath the substrate 10, the water vapour will firstly permeate the gas-permeable membrane 160. Subsequently the portion of the fluid 70 that has passed the gas-permeable membrane 160 will further pass the vapour travelling distance 120 by means of vapour diffusion and comes into contact with the exposed edge 45 of the migration layer 40. In FIG. 6 the exposed edge 45 is shown as the left hand edge of the migration layer 40. If the migration layer 40 comprises PVA, the exposed edge 45 will be capable of absorbing fluid 70 and liquid electrolyte will be permeating the migration layer 40 and comes into contact with the activation layer 20. This contact then triggers the change of doping level within the second portion 22 of the activation layer 20. The second portion 22 of the activation layer 20 and the second portion 42 of the migration layer 40 are not indicated within FIG. 6. The change in doping level within the second portion 22 of the activation layer 20 further leads to the effects already disclosed in connection with the activation of the apparatus 1.

The apparatus 1 as shown in FIG. 6 may be used as a temperature time indicator. It may prove convenient to connect the apparatus 1 according to FIG. 6 with a reservoir comprising the fluid 70 in such a way that the gas-permeable membrane 160 comes into contact with the fluid 70 within the fluid comprising reservoir.

In one example of the invention the fluid comprising reservoir may be, without any limitation to the invention, a milk pack or a sample tube for a blood sample. In such a case it would be convenient for the substrate 10 to be part of the reservoir. Alternatively the apparatus 1 may be residing on top and in contact with one of the walls of the reservoir. In this case the wall of the reservoir comprising the fluid 70 needs an opening that is connected with the opening 150 of the substrate 10 to allow the gas-permeable membrane 160 to come into contact with the fluid inside the reservoir.

It is also possible to incorporate the apparatus 1 according to the invention inside a closing lid of a blood sample tube or within a sealable opening of a paper bag containing drinks such as milk.

The activation of the apparatus 1 would occur immediately after filling and closing the reservoir enclosing the fluid 70. Water vapour from within the reservoir will permeate via the gas-permeable membrane 160 and the vapour travelling distance 120, thereby activating the apparatus 1. This permeation of the water vapour will cause the change in doping level within the second portion 22 of the activation layer 20.

In another aspect of the invention according to FIG. 6 the vapour travelling distance 120 may be omitted. Without the vapour travelling distance 120 the membrane 160 is directly covered by the migration layer 40. If the order of layers is inverted (Substrate 10, migration layer 40 and activation layer 20 from bottom to top), migration layer 40 and activation layer 20 may both cover the membrane 160 completely.

The reaction changing the doping level within the second portion 22 of the activation layer 20 can be an electrochemical reaction and/or a chemical reaction. The chemical reaction can be a chemical oxidation or a chemical reduction of the activation layer 20. It is also possible to change the doping level of the activation layer 20 by bringing the activation layer 20 into contact with a base or an acid from the migration layer 40. If an aspect of the apparatus 1 uses the chemical reaction the electrode 30 can be omitted.

Figure 7A:
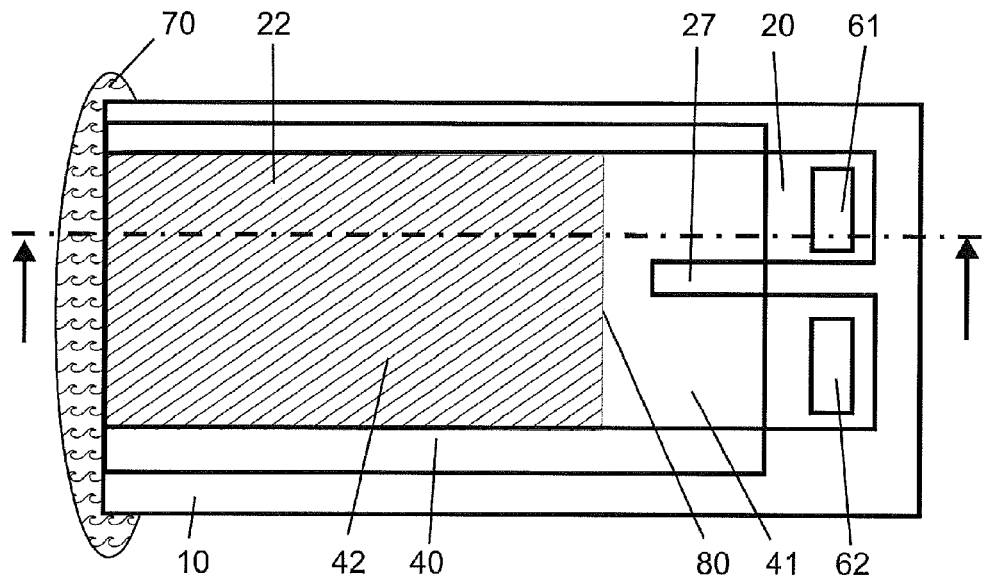
FIG. 7 shows the apparatus 1 with a narrow portion 27 arranged parallel to a direction of migration in a top view (FIG. 7a) and a cross-sectional view (FIG. 7b).
FIG. 7c shows an activation layer 20 of reduced length.
Figure 7B:
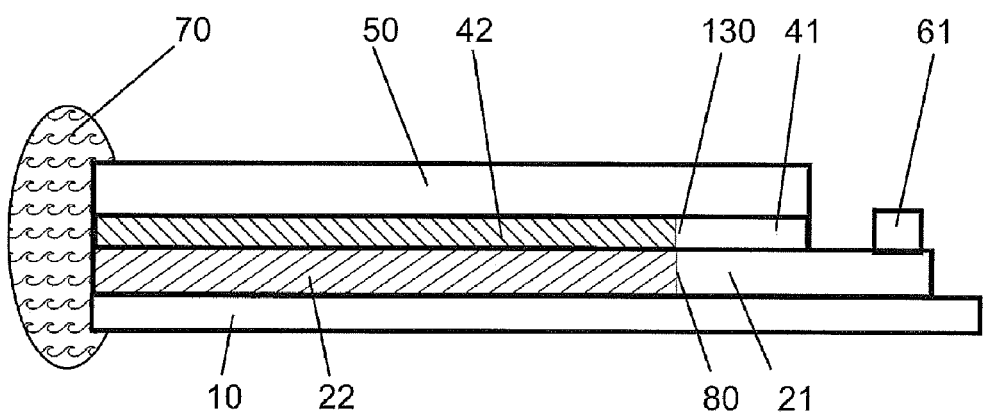

FIG. 7 shows an aspect of the invention according to FIG. 2, wherein the electrochemical reaction has been replaced by the chemical oxidation or the chemical reduction. FIG. 7a and FIG. 7b show the apparatus 1 as in FIG. 2a and FIG. 2b. The electrode 30 shown in FIG. 1 is missing in FIGS. 7a and 7b. Further the activation layer 20 shows a narrow portion 27 that is different from the apparatus 1 in FIG. 2. The first contact layer 61 is on and in contact with the activation layer 20 and the second contact layer 62 is on and in contact with the activation layer 20. The migration layer 40 is on top of the activation layer 20. The encapsulating layer 50 is on top of the migration layer 40. The encapsulating layer 50 is not shown in FIG. 7a for clarity purposes.

The activation of the apparatus 1 within this aspect of the invention is caused by the chemical doping within the activation layer 20. The chemical reduction or the chemical oxidation is triggered when the activation layer 20 comes into contact with the fluid 70. If the activation layer 20 comprises PEDOT:PSS, it is convenient for the fluid 70 to be a solution of hydrazine in water at a volume concentration of 85% for the chemical reduction of the activation layer 20.

The doping level of polyaniline can be controlled by bringing the polyaniline into contact with an acid (e.g. a citric acid in aqueous solution) or with a base (e.g. NaOH in aqueous solution). Without any limitation to the invention any other substance causing the chemical doping within the activation layer 20 may be used.

In case of the chemical reduction of the activation layer 20, the reaction will cause a change in light absorption properties of the activation layer 20 as well as a change in the electrical resistance of the activation layer 20.

The second portion 42 of the migration layer 40 being permeated with the fluid 70 is displayed as hatched area within FIG. 7. The first portion 41 of the migration layer 40 corresponds to the portion of the migration layer 40 not yet in contact with the fluid 70. The amount of permeation of the migration layer 40 is only displayed within FIG. 7b as an area that is hatched at a different angle.

In FIGS. 7a and 7b the chemically reduced portion of the activation layer 20 is shown comprising an edge 80. FIG. 7b shows the non-reduced and hence non-permeated first portion 21 of the activation layer 20.

The chemical reduction of the activation layer 20 causes the increase in electrical resistance for the second portion 22 of the activation layer 20. If the border 80 of the chemically reduced portion of the activation layer 22 reaches the narrow portion 27, this causes the increase in resistance. The increase in resistance can be measured between the contact layer 61 and the contact layer 62.

The change in resistance due to the chemical reaction (namely the chemical reduction or oxidation) can be used for the electrical switch. The electrical switch can be switching-on or switching-off of an electrochromic display element 180 or any other element.

The change in resistance can be used to cause a load modulation for an RFID system.

Figure 7C:
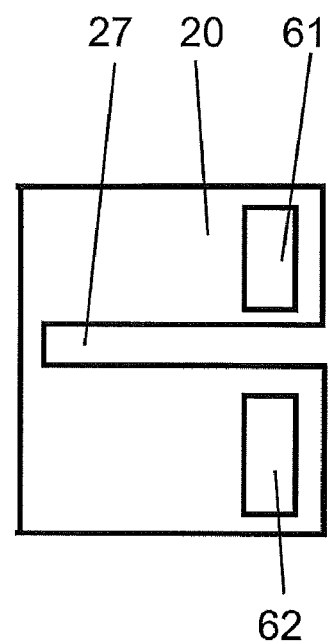

FIG. 7c shows the activation layer 20 that has a reduced length. The R(t) characteristics vary more pronouncedly. As soon as the edge 80 of the chemically reduced second portion 22 of the activation layer 20 reaches the left hand edge of the activation layer 20 there will be the increase in resistance. The increase in resistance can be measured across the contact layer 61 and the contact layer 62. Narrow portions 27 orientated parallel or perpendicular to the direction of migration can without any limitation be combined within one activation layer 20.

FIG. 8 shows how a plurality of the electrochromic display elements 220 may be switched in time such that one electrochromic display element 220b is switched after another display element 220a. The electrochromic display elements 220 can be implemented as parts of display elements. Examples include but are not limited to a single-segment element or as a seven-segment display element for numbers, letters, complete pictures or complete logos.

Figure 8A:
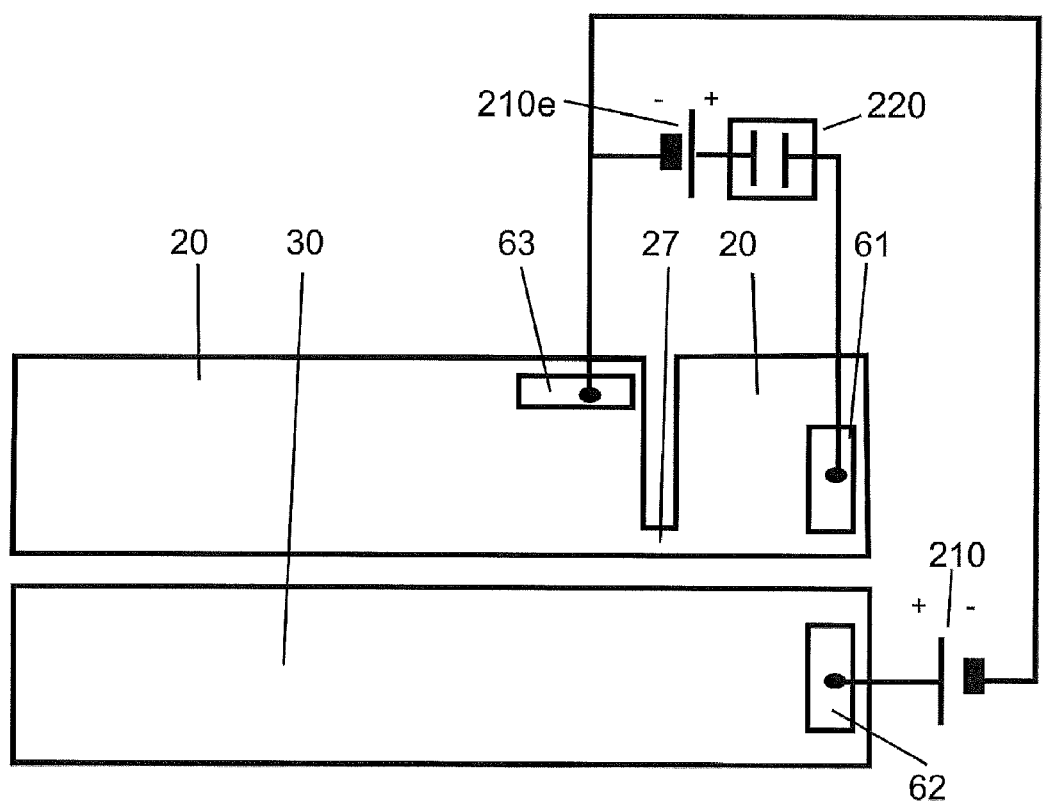
FIG. 8a shows the activation layer of FIG. 2a with two galvanic elements 210 and 210e and an electrochromic display element 220.

FIG. 8a shows a part of an aspect of the invention according to FIG. 2. The activation layer 20 within FIG. 8a comprises a narrow portion 27, the contact layers 61 and 63. The permeation of the fluid 70 is not shown within FIG. 8a, which actually is not different from FIG. 2a.

A galvanic element 210e is connected in series with the display element 220 between the contact layer 63 and the contact layer 61. The galvanic element 210e may provide a voltage of, for example, 1.5 Volts. The galvanic element 210e can be constructed within the substrate 10 of the apparatus 1 according to this invention.

The galvanic element 210 may be directly formed between the activation layer 20 and the electrode 30 together with the electrolyte within the migration layer 40. The galvanic element 210 provides a voltage that is sufficiently large and of correct polarity to trigger the electrochemical reductive reaction or the electrochemical oxidative reaction. This condition is conveniently met for a combination of PEDOT:PSS material for the activation layer 20 and a second material for the electrode 30, provided the standard potential within the electrode potential series for both materials (activation layer 20 and electrode 30) lies in the range from 0.3 volts to 5 volt. This holds true for aluminium and zinc. Without any limitation to the invention any other set of two materials may be used, for which a sufficiently large potential difference develops across the galvanic element 210 formed by the use of the set of two materials.

Furthermore the galvanic element 210 may as well comprise electrically conducting polymer material, such as PANI. To exemplify this consider the galvanic element 210 to comprise a first layer 240 and a second layer 250. Both of the first layer 240 and the second layer 250 are made from PANI. If the first layer 240 has been oxidised (electrochemically or chemically) during manufacture, and the second layer 250 is in the reduced state (electrochemical or chemical); the galvanic element 210 may be discharged, as soon as the electrolyte permeates the electrolyte matrix. The same direct discharge of the galvanic element is possible if either the first layer 240 only is oxidised (electrochemically or chemically), or the second layer 250 only is reduced (electrochemically or chemically). It is also possible for the first layer 240 to be chemically doped by an acid during the manufacture of the first layer 240 and the second layer 250 to be chemically doped by a base.

If the galvanic element 210 is formed between the activation layer 20 and the electrode 30, it is sufficient to connect the following points electrically to start the electrochemical reduction or the electrochemical oxidation. Contact between the terminals can most conveniently be established by means of a shortcut.

The terminals of the aspect of the invention of FIG. 1 are the contact layer 61 and the contact layer 62. The terminals of the aspect of the invention of FIG. 2 are the contact layer 63 (or 61) and 62. The terminals of the aspect of the invention of FIG. 3 are the contact layer 61 (or 62) and 63. A number of galvanic elements 210 can be combined either in series or in parallel.

Between the contact layer 61 and the contact layer 63 in FIG. 8a there is a combination of a galvanic element 210 (for example providing 1.5 Volts) and an electrochromic display element 220. If now, as within the example of FIG. 2, the edge 80 of the electrochemically reduced portion of the activation layer 20 passes the narrow portion 27 of the activation layer 20, this will cause a change in resistance. If the polarity of the galvanic element 210 is instead reversed, the second portion 22 of the activation layer 20 gets electrochemically oxidised together with the change in resistance. The change in electrical resistance measured across the contact sheets 63 and 61 will switch the current for the electrochromic display element 220.

Figure 8B:
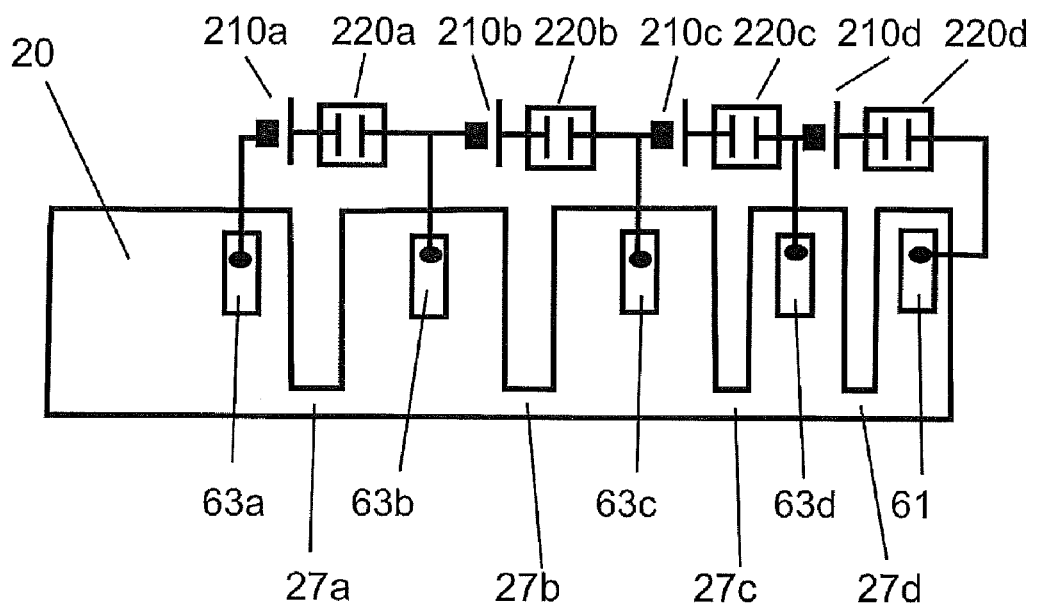
FIG. 8b shows the activation layer with a plurality of display elements 220 and a plurality of galvanic elements 210.

FIG. 8b shows the activation layer 20 comprising several narrow portions 27a, 27b, 27c and 27d together with several galvanic elements 210a, 210b, 210c and 210d. The display elements 220a, 220b, 220c and 220d may be switched in a timely succession from left to right if the permeation of the fluid 70 happens from left to right.

The electrical switch as disclosed within FIG. 2, FIG. 7 and FIG. 8 depends on the material used for the activation layer 20 and the state the activation layer 20 is in after the manufacture of the apparatus 1. The behaviour of the switch depends on whether the activation layer 20 is reduced (chemically or electrochemically) or oxidised (chemically or electrochemically). If PEDOT:PSS gets reduced, this will cause the electrical resistance of PEDOT:PSS to increase.

If PANI is used in the manufacture of the apparatus 1 in an oxidised state (electrochemically or chemically), the electrical resistance may due to the reduction (electrochemically or chemically) first show a drop in resistance and upon further reduction (electrochemical or chemical) start to increase again. It is also possible to use PANI in the manufacture of the apparatus 1 in the form of the emeraldine base, the electrical resistance may due to a chemical reaction with an acid, first show the drop in resistance and upon further chemical reaction, start to increase again.

This would allow for a switch to show an OFF-ON-OFF characteristic.

If, for example, the activation layer 20 comprising PANI is oxidised and the electrode 30 comprising PANI is reduced by means of the chemical reaction or the electrochemical reaction during the manufacture of the apparatus 1, the galvanic element 210 may be omitted and replaced by a short-cut between the contact layer 62 and the contact layer 63. The second portion 42 of the migration layer 40 that is permeated by the fluid 70 may then discharge the galvanic element 210 formed by the differently charged PANI layers 20 and 30. If the limit 80 of the electrochemically discharged activation layer 20 crosses the narrow portion 27, this causes a drop in resistance. The resistance between the contact layer 62 and the contact layer 63 was increased before the border 80 had crossed the narrow portion 27 due to the oxidised state achieved via the electrochemical or chemical reaction of the activation layer 20. The drop in resistance switches the current within the electrochromic display element 220.

Different forms of switches (ON, OFF or ON-OFF-ON) are possible depending on materials and the chemical states (oxidised or reduced by means of the electrochemical reaction or the chemical reaction e.g. with a base or an acid) of the material of the activation layer 20.

Figure 8C:
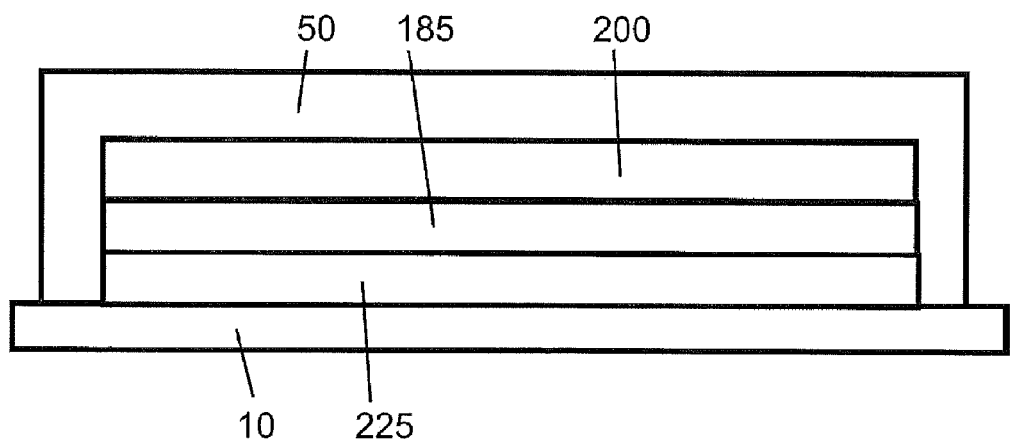
FIG. 8c shows the apparatus 1 in which the display element is permeated transversally.

FIG. 8c shows a possible example of an electrochromic display element 220. An electrode 225 is arranged upon the substrate 10. An electrolyte matrix layer 185 is arranged on top of the electrode 225. An electrochromic layer 200 is on top of the electrolyte matrix 185. The electrochromic layer 200 is covered with the encapsulating layer 50. The encapsulating layer 50 is transparent. The layers forming the electrochromic display element 220 may be arranged in a reversed order or in a lateral order. The electrode 225, the electrolyte matrix 185 and the electrochromic layer 200 may as well be arranged next to each other from left to right. If there is an electrical bias voltage of about 100 mV up to a few volts across the electrochromic layer 200 and the electrode 225, this causes an electrochromic reaction within the electrochromic layer 200.

The bias voltage may as well be imposed onto the apparatus 1 via an integrated additional galvanic element 210. It is possible to implement the electrochromic display element 220 in such a way that the electrical bias voltage is already provided due to the method of manufacture of the apparatus 1.

If for example the electrochromic layer 200 comprises PANI and has been chemically or electrochemically oxidized, and the electrode 225 comprising PANI has been electrochemically reduced or chemically reduced during the manufacture of the apparatus 1, the electrochromic element 220 can be discharged, once the electrolytic layer 185 has been permeated with the fluid 70. The permeation of the electrolytic layer with fluid 70 leads to a colour change within the electrochromic layer 200. The electrolytic layer 185 may very well be part or an extension of the activation layer 40.

Figure 9:
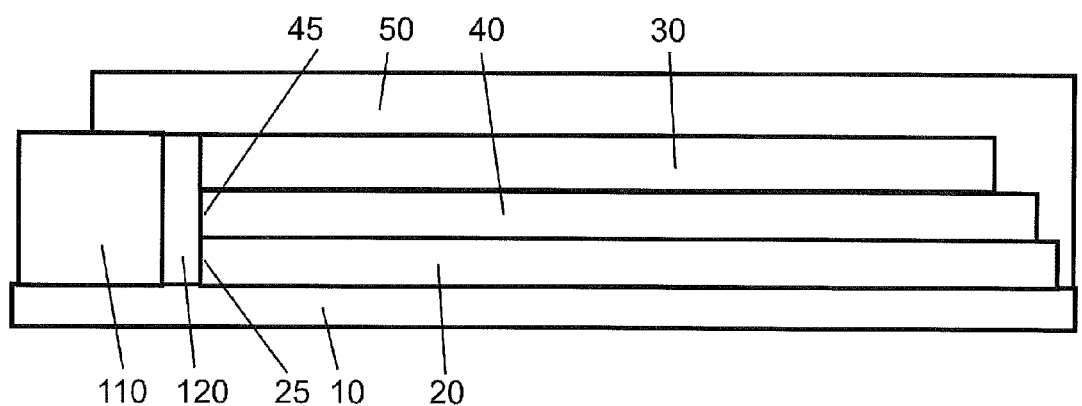
FIG. 9 shows the apparatus 1 in which the position of the electrode 30 of the display element is changed.

FIG. 9 shows another aspect of the apparatus 1 according to the invention disclosed in FIG. 4. This is a vertical variation of the apparatus 1 wherein the electrode 30 and the activation layer 20 are arranged vertically. In FIG. 9 one layer on top of each other is displayed in the following order: the substrate 10, the activation layer 20, the migration layer 40 and the electrode 30.

Together with the fluid container 110 and the vapour travelling distance 120 this figure corresponds to the arrangement according to FIG. 4. The functionality of the apparatus 1 according to FIG. 9 nevertheless corresponds to the aforementioned examples according to FIGS. 1 to 4 and 6.

Alternatively it is possible to implement the apparatus 1 according to FIG. 9 without the vapour travelling distance 120. In such an embodiment of the apparatus 1 the fluid container 110 would be in contact with the exposed edge 45 of the migration layer 40.

It is possible to use a slightly modified method of manufacture when implementing the aspect of the invention according to FIG. 9. The modified method of manufacture would start from a ready made PVA film that is commercially available from AICELLO CHEMICAL EUROPE GmbH [see http://www.solublon.com/german/pva_film.htm, as accessed on 27 Oct. 2007]. The PVA film is covered with the activation layer 20 on one of the surfaces of the PVA film. The second surface of the PVA film is covered with the electrode 30.

Such an arrangement of the activation layer 20 and the electrode 30 on top of the first surface and the second surface of the migration layer 40 (PVA film) may further be arranged on top of the substrate 10. It is possible to use a glue to bond the arrangement of the activation layer 20, the migration layer 40 and the electrode 30 to the substrate 10. It is also possible to use a heat sealing process for bonding. Moreover the encapsulating layer 50 is applied to the top side of the arrangement. In one example of the invention the encapsulating layer 50 comprises a layer of acrylic lacquer. Without any limitation it is possible to apply the encapsulating layer 50 to both sides of the arrangement before bonding the arrangement to the substrate 10.

The apparatus 1 manufactured by the modified method may without any limitation comprise the aspect of the invention according to FIG. 9, wherein the apparatus 1 comprises the fluid container 110 and a vapour travelling distance 120. It would also be possible to use the modified method of manufacture of the apparatus 1 according to the aspect of the invention shown in FIG. 1.

Figure 10A:
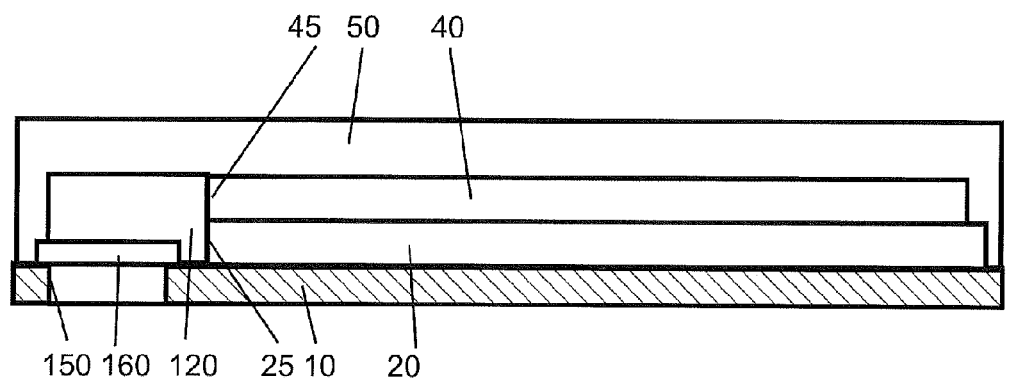
FIG. 10a shows the apparatus 1 with a gas-permeable membrane 160.
Figure 10B:
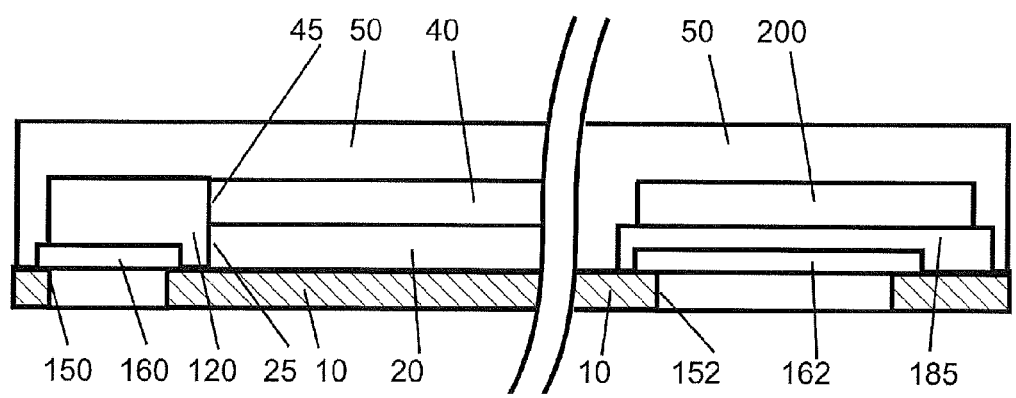
FIG. 10b shows the apparatus from FIG. 10a further comprising a display element that is permeated transversally.

FIG. 10 illustrates an aspect of the apparatus 1 according to this invention with an integrated electrochromic element 220. FIG. 10a corresponds to the embodiments according to FIG. 6 and shows the apparatus 1 comprising the gas-permeable membrane 160 in a cross-sectional view. In FIG. 10b there is the electrochromic element 220 integrated into the apparatus 1. The apparatus 1 according to FIG. 10b is shown as being divided in the middle. The left portion of the apparatus corresponds to the apparatus 1 shown in FIG. 10a. For purposes of clarity the electrical connections between the sections of the apparatus on the left hand side and the right hand side from the broken line are not shown. A second gas-permeable membrane 162 seals a second opening 152 within the substrate 10. On top of the second gas-permeable membrane 162 there is the electrolyte matrix 185 for the electrochromic element 220. The electrolyte matrix 185 may comprise the same material for example PVA as the migration layer 40. On top of the electrolyte matrix layer 185 there is an electrochromic layer 200. The apparatus 1 is further covered by the encapsulating layer 50.

Upon activation of the apparatus 1, the fluid 70 comes into contact with the gas-permeable membranes 160 and 162. The vapour components of the fluid 70 are capable of crossing the gas-permeable membranes 160 and 162. The activation of the left hand subsystem of the apparatus 1 within FIG. 10b has been disclosed within FIG. 6. The vapour components within the fluid 70 in the right hand subsystem of FIG. 10b are capable of crossing the gas-permeable membrane 162 and further permeate within the electrolyte matrix 185. The PVA within the electrolyte matrix 185 is capable of absorbing water. Hence a liquid electrolyte is now in contact with the electrochromic layer 200 and further in contact with an electrode 225 of the electrochromic element 220. The electrode 225 is not shown within FIG. 10b and arranged laterally on top of the electrolyte matrix layer 185. The contact of the electrolyte with the electrolyte matrix layer 185 and the electrode 225 activates the electrochromic element 220. A bias voltage applied across the electrochromic layer 200 and the laterally arranged electrode 220 triggers the electrochromic reaction.

Figure 10C:
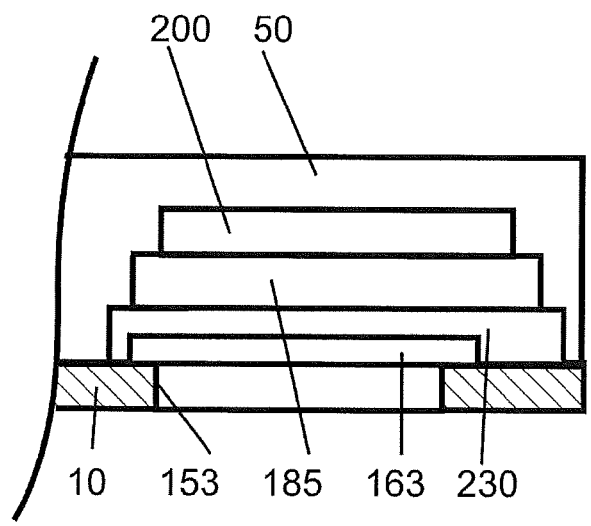
FIG. 10c shows another view of the apparatus 1.

The fluid 70 within the left hand portion of the apparatus 1 gradually permeates the migration layer 42 and travels from left to right (not shown within FIG. 10b). The fluid 70 within the right hand subsection of the apparatus permeates the electrolyte matrix layer 185 very rapidly in a vertical direction and the electrochromic element 220 becomes functional rapidly. It is also possible to arrange the layers of the electrochromic element 220 in a vertical manner, as is shown in FIG. 10c.

The opening 153 of the substrate 10 is covered by the gas-permeable membrane 163. There is the porous electrode 230 of the electrochromic element 220 on top of the gas-permeable membrane 163.

The porous electrode 230 can be implemented by using a blotting-paper matrix which is permeated by an electrically conducting polymer material, such as PEDOT:PSS or PANI.

The conductive polymer should not seal the blotting-paper matrix but leave the blotting-paper matrix still permeable to the electrolyte.

FIG. 10c shows on top of the porous electrode 230 an electrolyte matrix 185. The electrolyte matrix 185 is made of the same material as the migration layer 40. Preferably the electrolyte matrix 185 comprises PVA. The electrolyte within the electrolyte matrix layer 185 permeates the porous electrode 230. The electrochromic layer 200 is on top of the electrolyte matrix layer 185. The apparatus 1 is further covered with the encapsulating layer 50.

The fluid 70 upon activation permeates the membrane 163, the porous electrode 230 of the display element 220 together with the electrolyte matrix 185. This establishes the contact of the electrochromic layer 200 with the porous electrode 230 via the electrolyte and hence sets the electrochromic element 220 operative. It is sufficient to provide a bias voltage across the porous electrode 230 and the electrochromic layer 200 of the electrochromic element 220 to get the display element 220 operational.

Figure 11A:
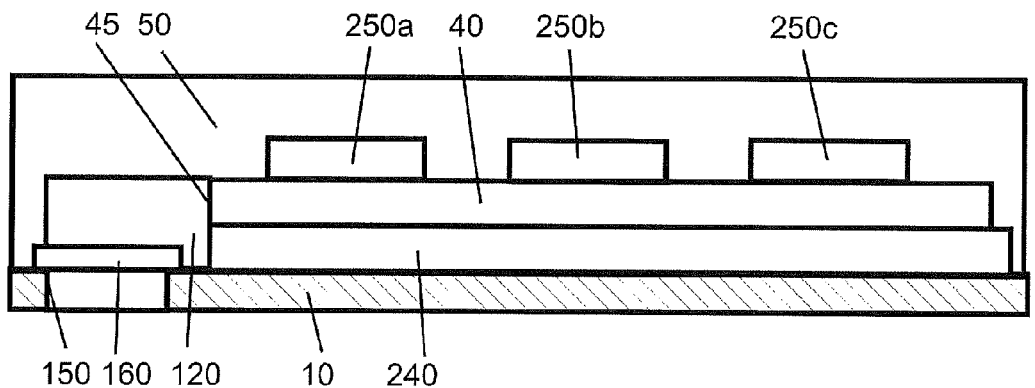
FIG. 11a shows the apparatus 1 with several galvanic elements comprising second layers 250a, 250b and 250c.

FIG. 11 shows an aspect of the apparatus 1 in which a plurality of the galvanic elements is activated in a successive order in time, i.e. one galvanic element comprising a second layer 250b after a galvanic element comprising a second layer 250a. FIG. 11a shows on the substrate 10 a first layer 240 for the plurality of galvanic elements formed by the second layers 250a, 250b and 250c. The migration layer 40 is on top of the first layer 240 of the plurality of galvanic elements formed by the second layers 250a, 250b and 250c. The second layers 250a, 250b and 250c are on top of the migration layer 40. The substrate 10 comprises the opening 150 which is sealed by the gas-permeable membrane 160. In this example, the gas-permeable membrane 160 is made of PTFE. To help clarity of the figure, the cross-section of the substrate 10 is displayed as hatched area.

The migration layer 40 comprises a polymer, preferably PVA. The left hand exposed edge 45 of the migration layer 40 is in contact with the vapour travelling distance 120. The vapour travelling distance 120 is implemented as a hollow volume. The whole apparatus 1 is further covered with the encapsulating layer 50.

The vapour portions of the fluid 70 will, if the gas-permeable membrane 160 comes into contact with the vapour portion of the fluid 70, further cross the membrane 160 and pass the vapour travelling distance 120 by means of vapour diffusion.

It is at this point in time that the water vapour comes into contact with the exposed edge 45 of the migration layer 40. The exposed edge 45 of the migration layer 40 is shown in FIG. 11a as the left edge of the migration layer 40. It is known that the PVA is capable of absorbing water. Therefore the PVA within the migration layer 40 will become partly dissolved and liquid electrolyte will permeate the migration layer 40 from left to right. The amount of permeation is not displayed within FIG. 11. The aspect of the apparatus 1 disclosed in FIG. 11 further comprises a plurality of second layers of the plurality of the galvanic elements. The plurality of second layers comprises a second layer 250a, a second layer 250b and a second layer 250c within FIG. 11a. The plurality of galvanic elements may be a single galvanic element or more than three galvanic elements.

The permeation of the electrolyte from left to right within the migration layer 40 will establish contact between the plurality of second layers 250a, 250b and 250c of the plurality of galvanic elements and the first layer 240 of the plurality of galvanic elements. The contact between a plurality of second layers 250a, 250b and 250c activates the plurality of galvanic elements in a timely order from left to right.

Figure 11B:
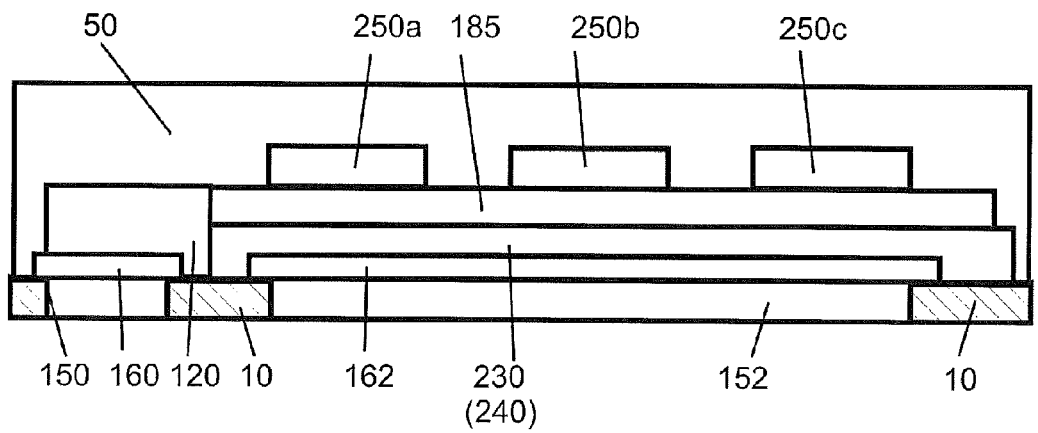
FIG. 11b shows the apparatus 1 with several galvanic elements comprising second layers 250a, 250b and 250c that are activated transversally.

In another aspect of the invention according to FIG. 11 the vapour travelling distance 120 may be omitted. Without the vapour travelling distance 120 the membrane 160 is directly covered by the migration layer 40. If the order of layers is inverted (Substrate 10, migration layer 40 and activation layer 20 from bottom to top), the migration layer 40 and the activation layer 20 may both cover the membrane 160 completely. It is possible to arrange the plurality of the galvanic elements 210 to be functional immediately after the activation of the apparatus 1 as shown in FIG. 11b. The apparatus 1 shown within FIG. 11b has the second gas-permeable membrane 162 that covers the second opening 152, as was the case for FIG. 10c (153 referring to the second opening within FIG. 10c). The first layer 240 of the plurality 211 of galvanic elements 210 is implemented as a porous electrode 230 on top of the second gas permeable membrane 162. The electrolyte matrix layer 185 is on top and in contact with the porous electrode 230. The porous electrode 230 can be implemented by using a blotting-paper matrix which is permeated by an electrically conducting polymer material, such as PEDOT: PSS or PANI. The conductive polymer should not seal the blotting-paper matrix but leave the blotting-paper matrix still permeable to the electrolyte.

The vapour portions of the fluid 70 that have crossed the second gas-permeable membrane 162 further permeate the porous electrode 230. The PVA is capable of absorbing water, as is discussed above. Hence the porous electrode 230 is now in contact with the electrolyte in a liquid state and further with the electrolyte matrix layer 185. The electrolyte further comes into contact with the second layers 250a, 250b and 250c of the plurality of the galvanic elements 210 and will set the plurality of galvanic elements comprising second layers 250a, 250b and 250c functional, such that all of the plurality the galvanic elements are functional at the same time. Hence the voltages across the plurality of galvanic elements comprising second layers 250a, 250b and 250c may be used for different functions of the apparatus 1. For example in one aspect of the invention the electrical voltages may be used to supply energy for the electrochromic elements 220 by means of switching functions.

Further it is possible to split the first layer 240 of the plurality of galvanic elements 210 into several sub elements, so that, for example each one of the galvanic elements 210 is supplied with a first layer and a second layer. The plurality of galvanic elements 210 would hence also comprise a plurality of first layers 240.

The materials used for the first layer 240 and the second layer 250 of the plurality of the galvanic elements may be chosen in such a way that primary and secondary elements can conveniently be implemented as known to a person skilled in the art.

Material combinations to form the galvanic elements 210 would be for example sal-ammoniac cell, nickelate hydroxide, lithium-iron sulphide; zinc-air, zinc-chloride, mercury oxide-zinc, silver oxide-zinc, alkaline-manganese.

Other material combinations for the galvanic elements would be without any limitation: lead dioxide-lead, nickel-cadmium, nickel-metal-hydride, lithium-polymer, alkaline-manganese, silver-zinc, zinc bromide, sodium nickel-chloride, nickel-iron and the like.

The plurality of galvanic elements 210 may be implemented using electrically conducting polymer materials for the plurality of the first layers 240 and the plurality of the second layers 250. Conveniently the material used for first layer 240 and second layer 250 could comprise PANI.

The plurality of the first layers 240 comprising PANI is prepared during the manufacture of the apparatus 1 in an oxidised state, via the chemical reaction or the electrochemical reaction. Further the plurality of the second layers 250 comprising PANI is prepared in a reduced state by means of the chemical reaction or the electrochemical reaction. With the plurality of the first layers 240 in an oxidised state and the plurality of second layers 250 in a reduced state, the plurality of galvanic elements 210 can be discharged, once the electrolyte permeates the electrolyte matrix 185.

The previous examples of the apparatus 1 illustrate the migration of the fluid 70 within a horizontal plane of the migration layer 40. The aspects of the apparatus 1 as disclosed so far could be referred to as the apparatus 1 comprising a lateral migration process.

The invention is however not limited to the migration of the fluid 70 within the plane of the migration layer 40. Without any limitation the apparatus 1 may comprise the migration of the fluid 70 in a direction perpendicular to the plane of the migration layer 40. The aspects of the apparatus 1 comprising the direction of migration perpendicular to the plane of the migration layer 40 could be referred to as the apparatus 1 comprising a transversal migration process.

Figure 12:
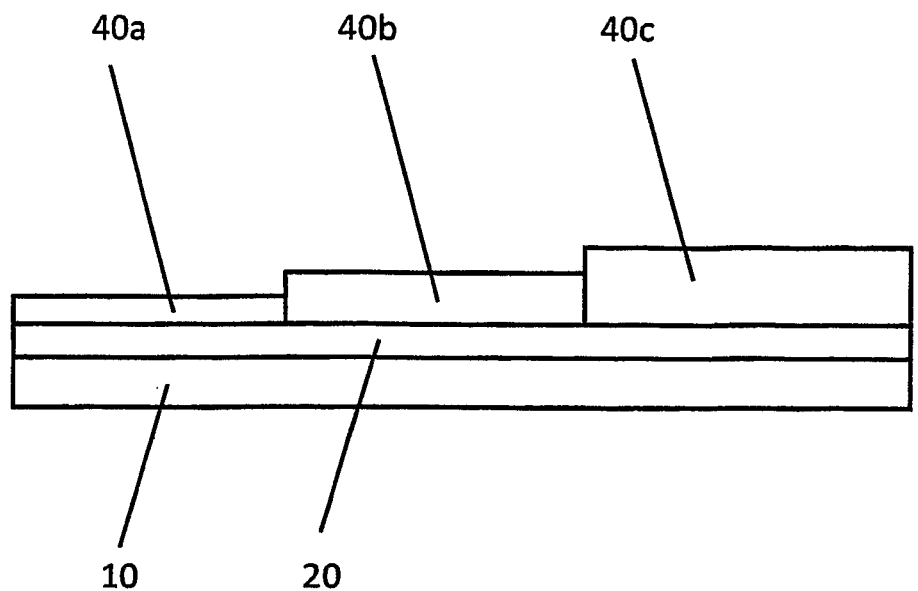
FIG. 12 shows a first example of the apparatus 1 with a vertical direction of migration comprising migration layers 40a, 40b and 40c of a different thickness.

FIG. 12 shows a first example of the apparatus 1 comprising the transversal migration process. FIG. 12 shows the substrate 10 and the activation layer 20 on top of each other. On top of and in contact with the activation layer 20 is a first migration layer 40a, a second migration layer 40b and a third migration layer 40c. The first migration layer 40a, the second migration layer 40b and the third migration layer 40c are of a different thickness. In the example shown in FIG. 12, the first migration layer 40a is thinner than the second migration layer 40b and the third migration layer 40c. Hence the thickness of the migration layer 40 gradually increases from the left hand side to the right hand side in FIG. 12. In other words, the migration layers 40a, 40b and 40c of FIG. 12 comprise steps.

If the fluid 70, not shown in FIG. 12, is brought into contact with a top surface of the first migration layer 40a, a top surface of the second migration layer 40b and a top surface of the third migration layer 40c, the fluid 70 will first have permeated the first migration layer 40a, thereafter the second migration layer 40b and eventually the third migration layer 40c. Therefore the fluid 70 within the migration layer 40a will first be in contact with a segment of the activation layer 20 adjacent to the first migration layer 40a, then with a segment of the activation layer 20 adjacent to the second migration layer 40b and eventually with a segment of the activation layer 20 adjacent to the third migration layer 40c. The contact of the fluid 70 with the activation layer 20 is therefore in a timely order.

The contact of the fluid 70 with the activation layer 20 will start the chemical or electrochemical reaction as described above. In the example of FIG. 12 the timely order of starting the chemical or electrochemical reaction will be from left to right.

The aspect of FIG. 12 showed three migration layers 40a, 40b and 40c of different thicknesses. A number of the migration layers 40a, 40b and 40c of different thicknesses may be only two or more than three, without any limitation to the invention.

Alternatively to the thickness of the migration layer 40 comprising steps, the thickness of the migration layer 40 may also vary linearly. The vertical migration of the fluid 70 through the migration layer 40 causes a lateral movement of the change in doping level within the activation layer 20, due to the linearly changing thickness of the migration layer 40.

Without any limitation the thickness of the migration layer 40 may vary according to an arbitrary function describing the thickness of the migration layer 40. Typically the thickness of the migration layer 40 is in the range of a few nm to a few 10 μm.

Figure 13:
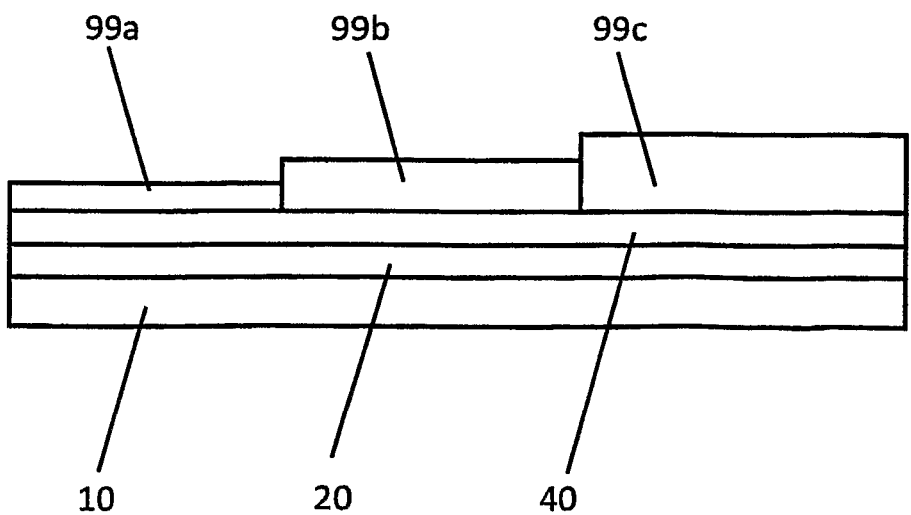
FIG. 13 shows a variation of the apparatus 1 with the vertical direction of the migration as shown in FIG. 12.

FIG. 13 shows a further aspect of the example of the apparatus 1 according to FIG. 12. The apparatus 1 shown in FIG. 13 comprises the transversal migration process. FIG. 13 shows the substrate 10, the activation layer 20 and the migration layer 40 on top of each other (bottom to top). The migration layer 40 is of a uniform thickness across the apparatus 1. On top of the migration layer 40 there is a barrier layer comprising steps of different thickness. The barrier layer comprises a first barrier layer 99a, a second barrier layer 99b and a third barrier layer 99c. A thickness of the barrier layers 99a, 99b and 99c increases from the first barrier layer 99a to the second barrier layer 99b and the third barrier layer 99c.

The barrier layers 99a, 99b and 99c may comprise any material permeable by the fluid 70. Without any limitation such materials can be: silicone, acrylic resin, PVC. The barrier layers 99a, 99b and 99c may further comprise the materials used for the encapsulating layer 50 and the substrate 10. It is possible for the barrier layers 99a, 99b and 99c to use the materials for the encapsulating layer 50 and the substrate 10, because the barrier layers 99a, 99b and 99c can be implemented as very thin layers. Typically the thickness of the barrier layers 99a, 99b and 99c is in the range of a few nm to a few 100 μm.

The different thickness of the barrier layers 99a, 99b and 99c yields a timely order for the contact of the fluid 70 with the migration layer 40. In FIG. 13 the contact of the fluid 70 with the migration layer 40 occurs first for a segment of the migration layer 40 adjacent to the first barrier layer 99a, second for a segment of the migration layer 40 adjacent to the second barrier layer 99b, and third for a segment of the migration layer 40 adjacent to the third barrier layer 99c. The timely order of the contact of the fluid 70 with the segments of the activation layer 20 will substantially be the same as a timely order for the fluid 70 getting in contact with segments of the migration layer 40.

If the fluid 70, not shown in FIG. 13, is brought into contact with a top surface of the first barrier layer 99a, a top surface of the second barrier layer 99b and a top surface of the third barrier layer 99c, the fluid 70 will first have permeated the first barrier layer 99a, thereafter the second barrier layer 99b and eventually the third barrier layer 99c. Therefore the fluid 70 within the barrier layer 99a will first be in contact with a segment of the activation layer 20 under the first barrier layer 99a, then with a segment of the activation layer 20 under the second barrier layer 99b and eventually with a segment of the activation layer 20 under the third barrier layer 99c. The contact of the fluid 70 with the activation layer 20 is therefore in a timely order.

The contact of the fluid 70 with the activation layer 20 will start the chemical or the electrochemical reaction as described above. In the example of FIG. 13 the time order of starting the chemical or the electrochemical reaction will be from left to right.

A number of the barrier layers 99a, 99b and 99c of different thickness may be only two or more than three, without any limitation to the invention.

Alternatively to the thickness of the barrier layers 99a, 99b and 99c comprising steps, the thickness of the barrier layers 99a, 99b and 99c may as well change linearly. The vertical migration of the fluid 70 through the migration layer 40 causes the lateral movement of the change in doping level within the activation layer 20, as within FIG. 12.

Without any limitation the thickness of the barrier layers 99a, 99b and 99c may vary according to an arbitrary function describing the thickness of the barrier layers 99a, 99b and 99c.

All aspects of the migration layer 40 as disclosed with respect to FIGS. 1 to 11 may also be implemented such that the migration within the migration layer 40 of the apparatus 1 comprises the vertical migration process.

Figure 14A:
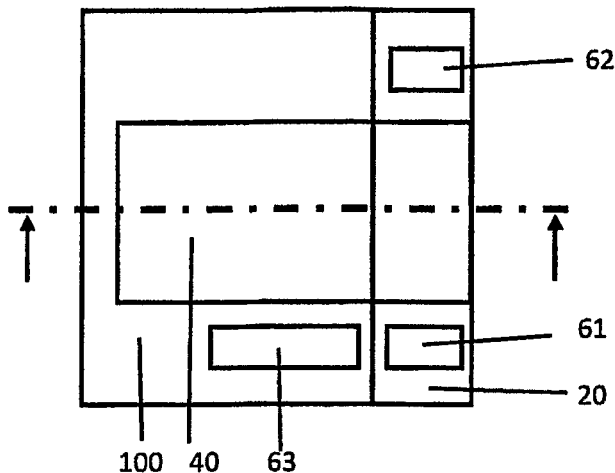
FIG. 14a shows a top view of the apparatus 1 forming a transistor of a depletion type
Figure 14B:
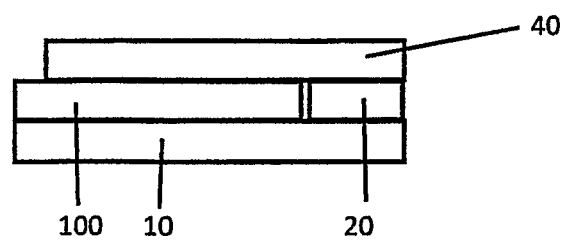
FIG. 14b shows a cross-sectional view of the apparatus 1 forming the transistor of the depletion type.

FIG. 14 shows a variation of the apparatus according to FIG. 3 comprising the vertical migration process within the migration layer 40. FIG. 14a shows a top view of the apparatus 1 and FIG. 14b shows a cross sectional view. A line of section is indicated as a dash-dotted line within FIG. 14a. The direction of view in the cross-sectional view of FIG. 14b is indicated by two arrows within FIG. 14a.

On the substrate 10 there is the electrode 100 as well as the activation layer 20. The electrode 100 and the activation layer 20 are covered and in contact with the migration layer 40. On top and in contact with the activation layer 20 there is the first contact layer 61, the second contact layer 62 and in contact with the electrode 100 is the third contact layer 63. The electrode 100 and the activation layer 20 are covered with the migration layer 40. An electrical current between the first contact layer 61 and the second contact layer 62 can be varied by applying a voltage across the first contact layer 61 and the third contact layer 63.

If, for example, the activation layer 20 and the electrode 100 comprise PEDOT and the voltage applied across the first contact layer 61 and the third contact layer 63 is in the range of 1 to 3 V of such a polarity that the contact layer 100 forms the anode and the activation layer 20 forms the cathode, the electrochemical reaction within the activation layer 20 will occur. More precisely, the electrochemical reduction will occur under the migration layer 40. The electrochemical reduction of the activation layer 20 yields an increase of the electrical resistance. The electrochemical reaction in the form of the electrochemical reduction starts after the fluid 70 has permeated the migration layer 40 by the vertical migration process.

An electrical conductivity of the activation layer 20 between the first contact layer 61 and the second contact layer 62 can be varied by a variation of the voltage applied across the first contact layer 61 and the third contact layer 63. Therefore the apparatus 1 of FIGS. 14a and 14b shows a characteristic of a transistor. There is no electrochemical reduction of the activation layer 20 without applying the voltage across the first contact layer 61 and the third contact layer 63. Hence without applying the voltage across the first contact layer 61 and the third contact layer 63 there is a relatively high electrical conductivity of the activation layer 20, when compared to the an electrical conductivity after the reduction of the activation layer 20. The transistor formed within FIGS. 14a and 14b is a transistor of a depletion type. The transistor of the depletion type is active after the migration layer 40 has been vertically permeated by the fluid 70.

A transistor of an enhancement type is shown in FIGS. 14c and 14d. FIG. 14c shows a top view of the transistor of the enhancement type, FIG. 14d shows a cross-sectional view of the transistor of the enhancement type. The direction of view within FIG. 14d is indicated by two arrows within FIG. 14c. FIGS. 14c and 14d show a support layer 66. The support layer 66 is a thin layer and arranged on the activation layer 20. The support layer 66 may be manufactured using thin film techniques, such as a vapour deposition of aluminium in a vacuum or a sputter technique. The support layer 66 may further be manufactured using a spraying process comprising an aluminium spray of aluminium particles with a diameter ranging from a few µm to a few 10 µm. The electrochemical reaction within the activation layer 20 starts without applying a voltage across the first contact layer 61 and the third contact layer 63, due to the different standard potentials of the activation layer 20 (for example comprising PEDOT) and the support layer 66 (for example comprising aluminium). The electrical conductivity between the first contact layer 61 and the second contact layer 62 is low for the setup of FIGS. 14c and 14d with the applied voltage of 0 V across the first contact layer 61 and the third contact layer 63; and hence the transistor is in the blocked state.

The electrical conductivity between the first contact layer 61 and the second contact layer 62 will increase, if a non-zero voltage is applied across the first contact layer 61 and the third contact layer 63 such that the activation layer 20 forms the anode and the electrode 100 forms the cathode. The increase in the electrical conductivity is due to the oxidation of the activation layer 20, if the activation layer 20 forms the anode and the electrode 100 forms the cathode. Hence the transistor shown in FIGS. 14c and 14d is of the enhancement type.

The transistor of the enhancement type is set operative, once the migration layer 40 is permeated vertically by the fluid 70 in FIGS. 14c and 14d.

The activation layers 20, the migration layers 40, the contact layers 61, 62, 63 and the electrode 100 may be manufactured as was explained with respect to FIG. 2.

The support layer 66 may comprise any material having a standard potential causing the intended electrochemical reaction, for example, the electrochemical reduction, to occur in an electrochemical cell. In case the activation layer 20 is made of PEDOT, suitable materials for the support layer 66 are, for example, aluminium and zinc.

With the aspects and functionality of the invention disclosed it is possible to implement the apparatus 1 with small dimensions as well as the apparatus 1 comprising large dimensions. The apparatus 1 according to this invention my further comprise little amount functionality as well as a large amount of functionality.

The invention has been described with respect to several aspects and embodiments of the invention. It will be appreciated by the skilled person that modifications may be possible which do not detract from the spirit and scope of the invention.

The invention claimed is:

1. An apparatus for activation of at least one element, the apparatus comprising
   a) at least one activation layer; and
   b) at least one migration layer arranged at the at least one activation layer and being permeable to a fluid along a transversal direction across a surface of the at least one migration layer, such that a change of doping level in the at least one activation layer is achieved, for activating the at least one activation layer along the transversal direction;
   wherein a substrate onto which the activation layer and the migration layer are deposited comprises an opening being sealed by a gas-permeable membrane, the gas-permeable membrane being in contact with a fluid container.

2. The apparatus according to claim 1, wherein the at least one activation layer comprises a first electrically conducting polymer.

3. The apparatus according to claim 1, further comprising at least a first contact layer extending on and in contact with the at least one activation layer.

4. The apparatus according to claim 1, wherein an encapsulating layer covers the at least one migration layer, leaving a migration layer edge of the at least one migration layer exposed, so that the migration layer edge is accessible to the fluid.

5. The apparatus according to claim 1, wherein the fluid is selected from the group consisting of water vapour, liquid water, a water based electrolyte, a base or an acid.

6. The apparatus according to claim 1, wherein the substrate is a supporting structure to accommodate an RFID module.

7. The apparatus according to claim 1, wherein the at least one activation layer comprises at least one of doped polyaniline (PANI), poly(ethylenedioxythiophene) (PEDOT) doped with polystyrenesulphonic acid or is selected from the group consisting of polythiophenes, polypyrroles, polyanilines, polyisothianaphtalenes, polyphenylene vinylenes, poly(para-phenylen), poly(para-phenylen-vinylen) and copolymers thereof, selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, poly-3-methylthiophene and poly-3,4-dimethylthiphene and copolymers therewith, such as a polymer or copolymer of a 3,4-dialkoxythiophene Poly(dialkylfluorene) derivatives cis-polyacetylen, trans-polyacetylen.

8. The apparatus according to claim 1, wherein the at least one migration layer comprises at least one of poly(vinyl alcohol) (PVA), sulphonated tetrafluoroethylene, poly (styrene sulphonic)acid (PSSH) and poly (ethylene oxide) (PEO) or an electrolyte, preferably selected from the group consisting of $CaCl_2$ and $LiClO_4$ solved within acetonitrile or a gel electrolyte, wherein the gel electrolyte comprises a mixture of tetrabutyl ammonium hexafluorophosphate (TBAPF6)/poly (methyl metacrylate) (PMMA)/propylene carbonate (PC)/acetonitrile (ACN); the mixture of TBAPF6/PMMA/PC/ACN is preferably being essentially in a ratio of 3:7:20:70 by weight.

9. The apparatus according to claim 8, wherein the at least one migration layer comprises the electrolyte within a capillary material; wherein the capillary material is selected from the group consisting of paper, blotting paper, chromatography paper, a thin layer of adsorbent material, usually silica gel, aluminium oxide or cellulose as well as any combination or composite material formed from the members of the group.

10. The apparatus according to claim 1, wherein the at least one migration layer further comprises at least one of micro particles or nanoparticles to tune a velocity of migration within the migration layer; the micro particles and/or nanoparticles comprising at least one of titanium oxide, or silicon dioxide.

11. The apparatus according to claim 1, wherein the at least one element is selected from a group consisting of an electrochromic display element, an electrical switch, a time controlled resistor, a galvanic cell and a galvanic element or any combination thereof; wherein the at least one element is in direct contact with at least one of the at least one activation layer or the at least one migration layer.

12. The apparatus according to claim 11, wherein the element is a switch, and the at least one activation layer comprises one or more narrow portions, wherein each of the narrow portions causes a change of the state of the switch selected from the group consisting of ON, OFF, ON-OFF-ON and OFF-ON-OFF.

13. The apparatus according to claim 1, being part of a wall of the fluid container comprising the fluid, wherein the fluid container is a blood sample container or a food container.

14. The apparatus according to claim 1, wherein the at least one activation layer comprises aluminium.

15. The apparatus according to claim 1, further comprising at least one activation layer and at least a second contact layer extending on and in contact with an electrode.

16. A method of activation of an at least one element of an apparatus, wherein the apparatus has an at least one activation layer and an at least one migration layer, the at least one migration layer being permeable to a fluid, comprising the following steps:
   a. Establishing a contact between an exposed edge of the at least one migration layer and the fluid,
   b. Allowing the fluid to permeate within the at least one migration layer, thereby creating a first portion and a second portion of the at least one migration layer and a first portion and a second portion of the at least one activation layer, whereby the second portion of the at least one migration layer is permeated by the fluid and at least a surface of the second portion of the at least one activation layer is in contact with the fluid; whereas the first portion of the at least one migration layer, and the first portion of the at least one activation layer essentially are not permeated nor in contact with the fluid;
   c. Creating a travelling edge between the first portion of the at least one activation layer and the second portion of the at least one activation layer; as well as a migrating edge between the first portion of the at least one migration layer and the second portion of the at least one migration layer; whereby the contact of fluid with at least the surface of the second portion of the at least one activation layer causes a change in doping level of the second portion of the activation layer, thereby activating the at least one element that now has established contact with the fluid.

17. The method of activation of claim 16, wherein the change in doping level is induced by an electrochemical reaction or a chemical reaction; wherein the change in doping level further causes at least one of a colour change of the second portion of the at least one activation layer or a change in resistance of the second portion of the at least one activation layer.

18. The method of activation according to claim 16, wherein the change in doping level is due to at least one of a reductive reaction or an oxidative reaction of the activation layer.

19. The method of activation according to claim 16, wherein the change in doping level is triggered by applying a bias voltage between a first contact layer and a second contact layer.

* * * * *